United States Patent [19]
DeCaro et al.

[11] Patent Number: 5,982,957
[45] Date of Patent: Nov. 9, 1999

[54] SCANNER ILLUMINATION

[75] Inventors: Joel D. DeCaro, Brockport; Mark E. Shafer, Fairport, both of N.Y.

[73] Assignee: Eastman Kodak Company, Rochester, N.Y.

[21] Appl. No.: 09/052,473

[22] Filed: Mar. 31, 1998

[51] Int. Cl.$^6$ ............................. H04N 1/04; H04N 1/46
[52] U.S. Cl. .................... 382/312; 358/505; 358/509; 358/513; 358/475; 358/474
[58] Field of Search ......................... 358/474, 475, 358/479, 480, 482, 483, 505, 506, 509, 510, 513, 514; 382/312

[56] References Cited

U.S. PATENT DOCUMENTS

| | | |
|---|---|---|
| 3,760,174 | 9/1973 | Boenning et al. . |
| 3,923,394 | 12/1975 | Frankiewicz . |
| 4,013,915 | 3/1977 | Dufft . |
| 4,255,042 | 3/1981 | Armitage, Jr. et al. . |
| 4,589,766 | 5/1986 | Fursich et al. . |
| 4,658,303 | 4/1987 | Nagano .................... 358/294 |
| 4,672,219 | 6/1987 | Iwabuchi et al. . |
| 4,689,691 | 8/1987 | Isogai et al. . |
| 4,725,889 | 2/1988 | Yaniv et al. . |
| 4,745,465 | 5/1988 | Kwon ......................... 358/80 |
| 4,791,493 | 12/1988 | Ogura et al. . |
| 4,826,269 | 5/1989 | Streifer et al. . |
| 4,931,860 | 6/1990 | Narumiya .................. 358/75 |
| 4,954,914 | 9/1990 | Karita et al. . |
| 4,963,933 | 10/1990 | Brownlee . |
| 5,001,609 | 3/1991 | Gardner et al. . |
| 5,003,379 | 3/1991 | Moore, Jr. et al. . |
| 5,012,346 | 4/1991 | DeJager et al. . |
| 5,032,960 | 7/1991 | Katoh . |
| 5,099,359 | 3/1992 | Hrycin et al. . |
| 5,191,406 | 3/1993 | Brandestini et al. . |

(List continued on next page.)

FOREIGN PATENT DOCUMENTS 1-1116630  5/1989  Japan ............................. G03B 27/54

OTHER PUBLICATIONS

Scientific American, Nonimaging Optics by Roland Winston, Mar. 1991, pp. 76–81.

Journal of Applied Photographic Engineering, vol. 9, No. 2, Apr. 1983, "The Influence of Film, Paper, and Printer Spectral Characteristics on Photofinishing Performance", by W.C. Kress and P.J. Alessi, pp. 58–62.

Journal of the Optical Society of America, vol. 40, No. 2, Feb. 1950, "Objectives and Methods of Density Measurement in Sensitometry of Color Films", by Franklin C. Williams, Kodak Research Labs, pp. 104–112.

*Primary Examiner*—Jerome Grant, II
*Attorney, Agent, or Firm*—Gordon M. Stewart; Frank Pincelli

[57] ABSTRACT

A scanner has a sensor assembly having a sensor to receive light from an image, and which assembly generates an image signal corresponding to the image, which image signal has a plurality of color channel components representative of different spectral regions. A media holder holds a media carrying the image. An illuminator to illuminate the image of a held media such that light from the image falls on the sensor. The illuminator has a plurality of sets of light emitting elements to provide illumination in all of the spectral regions, each set having a different spectral output with at least a first set having plural sub-sets of different spectral output within a first one of the spectral region represented by the color channels, the number of different spectral output elements being greater than the number of color channels. The illuminator also has an integrator between the array and the media holder so as to improve uniformity of the illumination from the illuminator which illuminates the image. A method of calibrating a scanner, and a method of scanning images using a scanner are also provided.

20 Claims, 19 Drawing Sheets

U.S. PATENT DOCUMENTS

| | | |
|---|---|---|
| 5,229,870 | 7/1993 | Inoguchi . |
| 5,255,171 | 10/1993 | Clark . |
| 5,268,752 | 12/1993 | Fukada ................................... 358/500 |
| 5,283,425 | 2/1994 | Imamura . |
| 5,313,289 | 5/1994 | Nagane et al. . |
| 5,420,712 | 5/1995 | Maeda et al. . |
| 5,436,464 | 7/1995 | Hayano et al. . |
| 5,444,520 | 8/1995 | Murano . |
| 5,450,120 | 9/1995 | Nishio . |
| 5,537,229 | 7/1996 | Brandestini et al. . |
| 5,548,120 | 8/1996 | Parker et al. . |
| 5,568,225 | 10/1996 | Tazawa et al. . |
| 5,589,953 | 12/1996 | Tazawa et al. . |
| 5,654,809 | 8/1997 | Beeman ................................... 358/504 |

SCANNER ILLUMINATION

FIELD OF THE INVENTION

This invention relates generally to the field of illuminators, and particularly to scanners incorporating such systems.

BACKGROUND OF THE INVENTION

Scanners convert hard copy analog images on a media into image signals typically in the form of digital data. The media can be either transmissive (for example, a photographic negative) or reflective (for example, paper). The use of scanners has become widespread for a variety of applications, including storing, manipulating, transmitting and displaying or printing copies of the images. For example, images captured in photographic media can be converted to digital data and stored on compact discs for readout and display as a video image or for printing with various types of color printers. In order to capture the photographic image signal, an image frame is scanned with light, such as a line of light, and the light transmitted through the image is detected, typically as three primary color light intensity signals, and then digitized. The digitized values may be formatted to a standard for video display and stored on compact disc, magnetic media, or other suitable storage. Scanners take a variety of forms and the various common aspects of film digitizing, particularly line illumination and linear CCD-based digitizers, are described in greater detail in U.S. Pat. No. 5,012,346. For example, in one common type of scanner a one-dimensional sensor (typically referenced as a line sensor or one-dimensional array) is used and the illumination source directs a line of light onto the image bearing media, which is then moved one line at a time to scan the complete image line by line. In another scanner type, a two-dimensional sensor (typically referenced as a two dimensional or area array) is used, and the illumination source illuminates the entire image at the same time, so that the complete image is scanned in a single exposure. Scanners with area arrays are simpler to construct and are often preferred. However, scanners with line sensors provide higher resolution at lower equipment cost. A sensor assembly of a typical color scanner includes both the sensor and suitable electronics, so as to provide a multi-color channel output signal representing the scanned image, with each color channel corresponding to a different spectral region (for example, red, green and blue channels, or cyan, magenta and yellow channels).

In order to obtain image signals that accurately represent a scanned image, the illumination source used in a scanner must meet certain requirements. One is that the light must be of sufficiently high intensity. While this can be obtained by using higher-powered light sources, this leads to greater heat generation with required means to control such heat, and often to a light source with a shorter life. The illumination source should also provide uniform intensity of illumination so that the signal-to-noise ratio does not vary across the extent of the image of a media being scanned. Although correction to the image signal can be used to remove the effects of such non-uniformity, doing so causes regions of low illumination to be noisier than regions of high illumination from the higher gain applied there. Additionally, since the media to be illuminated may contain defects such as scratches, it is well known that the visibility of such defects may be reduced by distributing the light onto the media at angles of incidence up to +−45 degrees. This is generally accomplished either by using a diffusing element such as ground glass or a diffuse integrating chamber with or without an optical waveguide in close proximity to the media. Many of these desirable features (such as intensity and uniformity of illumination) become more difficult to obtain in area array scanners.

It is possible to use as a light source, a broadband, white light source with appropriate filters to remove undesirable spectral components. One such known prior art arrangement is illustrated in FIG. 1. In FIG. 1, a broadband white light source, in the form of an incandescent light bulb 2, is positioned in a reflector 4 to direct light to an multi-layer interference filter 6 (sometimes referred to as dichroic filters). Interference filter 6 is constructed to reject infrared (to which a scanner sensor may be sensitive). The filter may also be designed to improve color balance by removing unwanted components of visible light. Color balance is the balance between the red, green and blue channels. Such interference filters are expensive to construct. Light from filter 6 then enters a non-imaging optic light concentrator cone 8 and through an input port 11 of a integrating chamber 50. The inside of integrating chamber 50 is made of a diffuse reflective material so that a relatively uniform beam of light leaves an exit port 12 toward a media to be scanned, then onto an area array sensor.

The above illumination system is relatively effective. However, it is relatively fixed in the sense of producing one particular output, unless one adds mechanical filter wheels or similar arrangements to provide some degree of freedom over light source control. Thus, light source control beyond color balance or total exposure, is not readily obtained.

On the other hand, U.S. Pat. No. 5,191,406 discloses a line scanner in which lines of differently colored light emitting diodes (LEDs) are used to provide lines of illumination of different colors. The relative ON times of the different colored LEDs may be adjusted to provide a desired color balance between the red, green and blue lines, which correspond to the red, green and blue color channels obtained from the sensor. Again, light source control beyond color balance, is not readily obtained from such a line scanner. U.S. Pat. No. 5,003,379 discloses a scanner in which relatively complex different shaping filter sets, are used to cause a scanner spectral sensitivity to overlap the dye absorption peaks in a negative or positive image. U.S. Pat. No. 5,099,359 discloses a scanner in which, for a given film type, color balance, IR rejection and notch filtering requirements are obtained with a single interference filter. The scanners of both '379 and '359 patents then, use different filters for different films, thereby requiring mechanical filter changing arrangements, and are limited in their ability to affect scanner spectral sensitivity by virtue of filter technology. That is, filters inherently can only subtract light obtained from a light source. Furthermore, some filters can be expensive to construct. Additionally, filtering inherently wastes power and may cause unnecessary heat generation.

It would be desirable to provide a scanner which has any one or more of the following properties, namely the scanner sensitivity can not only be controlled for color balance between color channels, but also provide a readily shaped sensitivity spectrum within one more color channels which is not limited by filter technology, which can very readily and accurately alter the shape of the scanner sensitivity spectrum for different media to be scanned without the need for cumbersome filter changes, which has relatively high power efficiency, and which can still provide good light uniformity to an image to be scanned, and which illumination source generates relatively little heat.

SUMMARY OF THE INVENTION

One of the items recognized by the present invention is that in a scanner, the scanner "spectral sensitivity" within each color channel can affect the accuracy with which colors in a scanned image are captured. This scanner spectral sensitivity is a combined function including the illumination exposure spectrum provided by the illumination source and the sensor spectral sensitivity for each channel. That is, the scanner spectral sensitivity in effect determines how a scanner can "see" an image (effectively, this is the ability of the scanner to detect absorption in the image at different wavelengths). The present invention further realizes that for a given sensor, spectral sensitivity of the scanner in a given color channel can be readily controlled by controlling the shape of the illumination spectrum provided by the illumination source to that color channel of the sensor.

Accordingly, the present invention provides in one aspect, a scanner having a sensor to receive light from an image and generate an image signal corresponding to the image, which image signal has a plurality of color channel components representative of different spectral regions sensed by the sensor. A media holder of the scanner is provided to hold a media carrying the image. A scanner illuminator illuminates the image of a held media such that light from the image falls on the sensor. The illuminator has a plurality of sets of light emitting elements. Each set of light emitting elements has a different spectral output with at least a first set having plural sub-sets of different spectral output within a first spectral region represented by a first color channel. The number of different spectral output elements is greater than the number of color channels. The illuminator also includes an integrator between the light emitting elements and the media holder so as to improve uniformity of the illumination at the image. While the present invention contemplates the possibility of not using an integrator, such an arrangement is less desirable in that the integrator can provide better spectral uniformity of the illumination to the image.

In one aspect, the elements of each set have a majority of their integrated spectral output within a spectral region represented by a corresponding color channel. By "integrated spectral output" is referenced the total area under a curve of output power versus wavelength. The integrator preferably improves spectral uniformity of the illumination from at least the first set of light emitting elements.

The present invention further provides a method of spectrally calibrating a scanner of the present invention. In such a method, a sub-set of light emitting elements of the same spectral output corresponding to one color channel, is operated for predetermined times or powers. The signals in the one color channel from the sensor assembly corresponding to the elements operated in the preceding step are measured. These two foregoing steps are repeated for each sub-set of elements of different spectral output corresponding to the same one color channel. Characteristic actual values of the signals so obtained are compared with aim values. When the actual and aim values differ by more than a predetermined tolerance, the time or power used in the first recited step can be varied, and all of the steps repeated, as necessary, until the characteristic actual values and the aim values differ by no more than the predetermined tolerance so that a first aim scanner spectral sensitivity is obtained.

The present invention also provides a method of scanning an image using a scanner of the present invention. In this method, the image is illuminated with the illuminator after the light has passed through the integrator. The image signal is generated at the sensor assembly, and may be used as desired.

Scanners of the present invention then, provide a relatively simple and relatively accurate means by which an exposure spectral distribution from the scanner illumination source can be adjusted within one or more color channels. Additionally, scanners of the present invention can also provide a ready means by which the conventional color balance between channels can be controlled. Such control of the exposure spectral distribution provides a ready means of adjusting scanner spectral sensitivity in one or more color channels. The nature of such scanner spectral sensitivity control allows for ready spectral calibration of the scanner to meet a desired aim scanner spectral sensitivity. This control is readily adaptable to permit communication of control data sets corresponding to different aim scanner spectral sensitivities, from a remote host.

BRIEF DESCRIPTION OF THE DRAWINGS

Throughout the drawings, the same reference numerals have been used to represent like parts where possible.

DETAILED DESCRIPTION OF THE INVENTION

Figure 1:
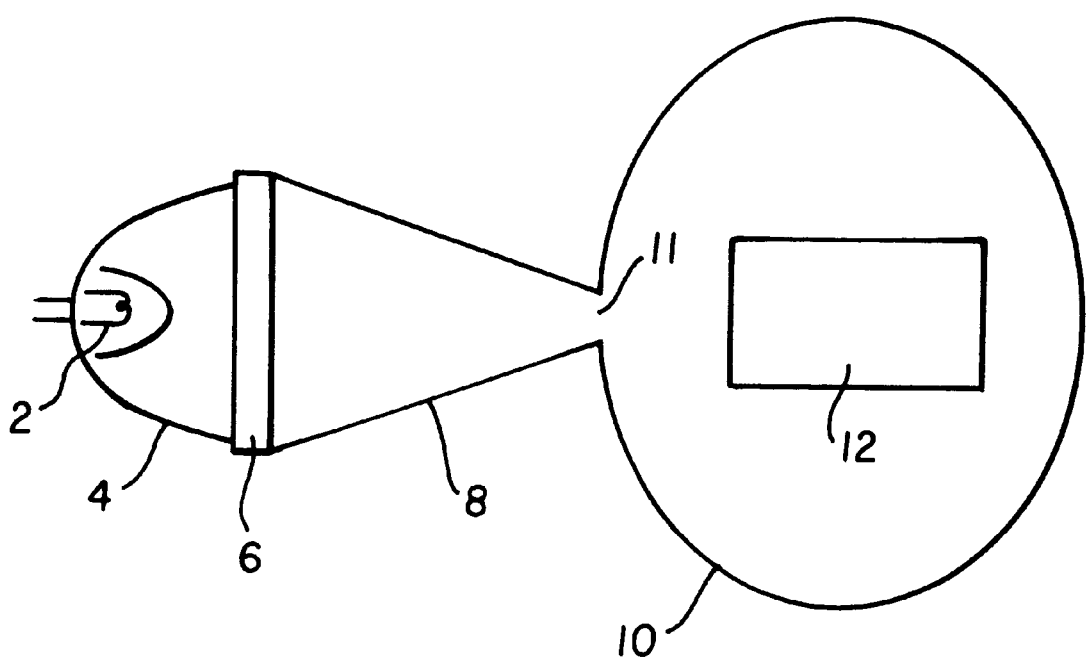
FIG. 1 illustrates a typical prior art scanner illumination source, as described above.

In the present invention, reference to "scanner spectral sensitivity", indicates a combined function of the illumination exposure spectrum within each color channel provided by the illumination source, and the sensor spectral sensitivity, as discussed above. "Exposure" represents integrated power over time, so that exposure from a light source can be varied by varying power and/or total time. By a "sensor assembly" of the scanner is referenced those scanner components which together receive light which has passed through the image, and generate the plural color channel component signal. In the case where a line or area array sensor is used and the sets of light emitting elements are turned on sequentially, the sensor itself has no means of distinguishing one perceived color from another. In this case, the sensor assembly includes suitable circuitry for designating each signal as representing a particular spectral region (such as red, green, and blue signals). In the case where a sensor is used which has separate elements for detecting light of different colors (that is, different spectral regions), then the sensor assembly may be simply the sensor itself since the each signal is already designated as belonging to a particular color channel simply from which sensor element the signal comes. Sensors of this latter type include tri-linear sensors with a filtered linear sensor element for each of red, green and blue color channels, as well as area arrays using patterned color filter arrays. With these types of sensors the different sets of light emitting elements will normally be turned on simultaneously. With regard to reference to red, green and blue color regions which correspond with red, green and blue color channels, such regions are normally considered to encompass the spectral regions between about 600–750 nm, 500–600 nm, and 400–500 nm, respectively. It will be appreciated that each color channel need not in itself correspond to a single spectral region (such as in a subtractive color system, or a color difference system). It will also be understood in this application, that a "set" (or sub-set) includes one or more elements.

Referring now to FIGS. 1 through 10 in particular, the present concept of spectral distribution control within a channel to control scanner spectral sensitivity within that channel, and its importance, can be understood. First, the present invention further recognizes that it is desirable to provide an actual scanner spectral sensitivity over one or more color channels (preferably over all the scanner color channels) which approximates a desirable aim (the "aim scanner spectral sensitivity"). Transparent negative film is generally designed to be optically printed onto photographic paper, such that the density versus log exposure curves of the cyan, magenta and yellow film dyes as "seen" by the paper are essentially parallel curves so as to maintain neutral tone scales under different film scene exposure conditions. Thus, to maintain the same neutral tone scales, a good aim scanner spectral sensitivity for negative film is one that would be the same or similar to the spectral sensitivity of a conventional optical photographic printer with a typical paper referenced as "printing density spectral sensitivity" (for instance, see page 247 from "The Reproduction of Colour", by R. W. G. Hunt, 4th edition. That reference, and all other references cited herein, are incorporated in this application by reference.

Alternatively, for positive images (typically slide film transparency, or any reflective media), these will normally be illuminated with a white light source and viewed directly. Therefore, a good aim scanner spectral sensitivity would be that of the human eye in combination with such light source. The Commission Internationale De L'Eclairage (CIE) has standardized spectral curves for both trichromatic color matching (approximating the human eye response) and the viewing illuminants, which combined together would make up an aim scanner spectral sensitivity. For example, one might choose the 1931 CIE 2-degree standard observer, and a D5000 illuminant, described for example in sections 2 and 4 from "Measuring Colour", by R. W. G. Hunt.

Figure 2:
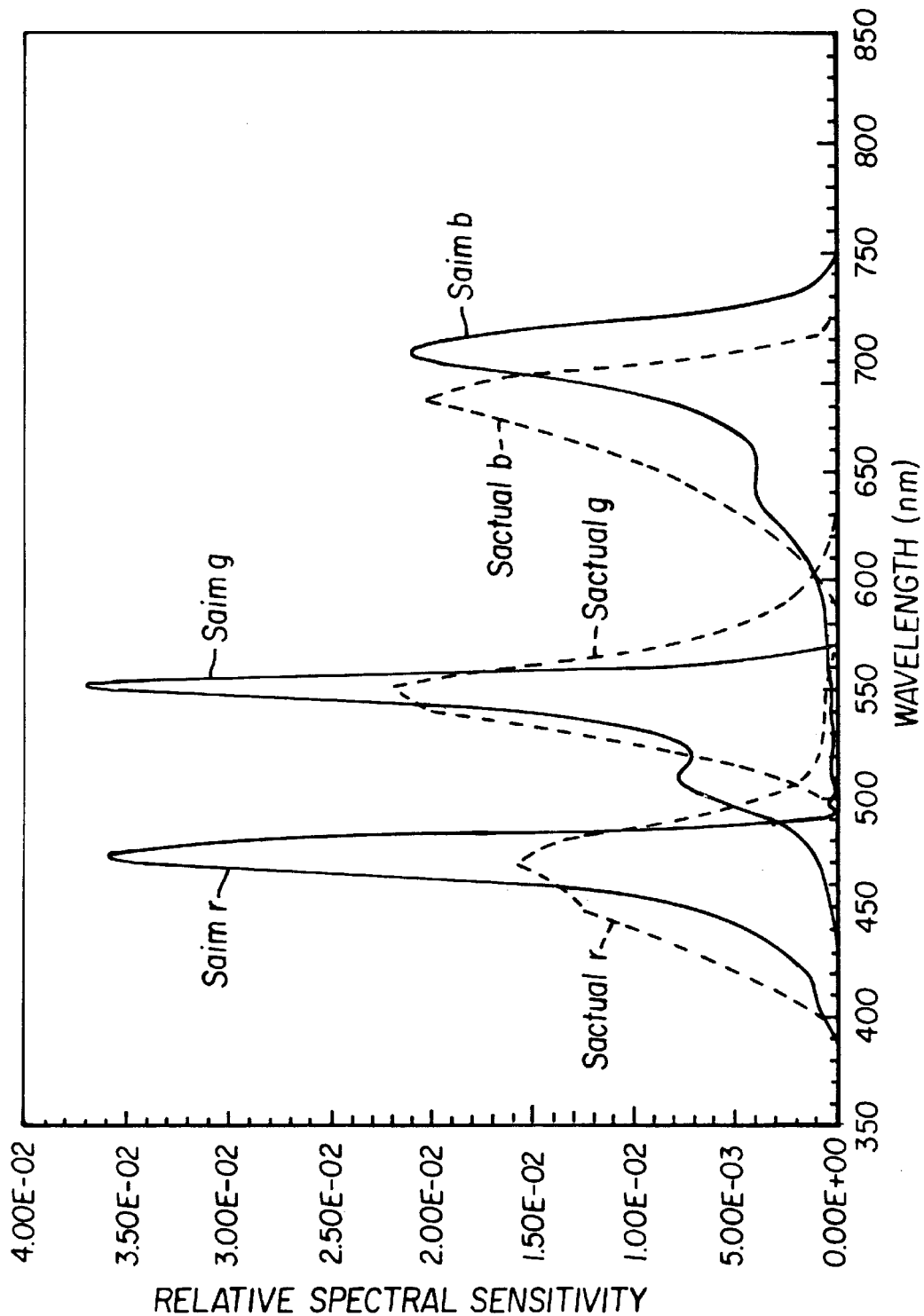
FIG. 2 illustrates a desirable scanner aim spectral sensitivity (solid lines) representing a combined illumination source spectrum and sensor sensitivity spectrum, and an actual scanner spectral sensitivity (dotted lines) obtained in a scanner with a typical illumination source.
Figure 3:
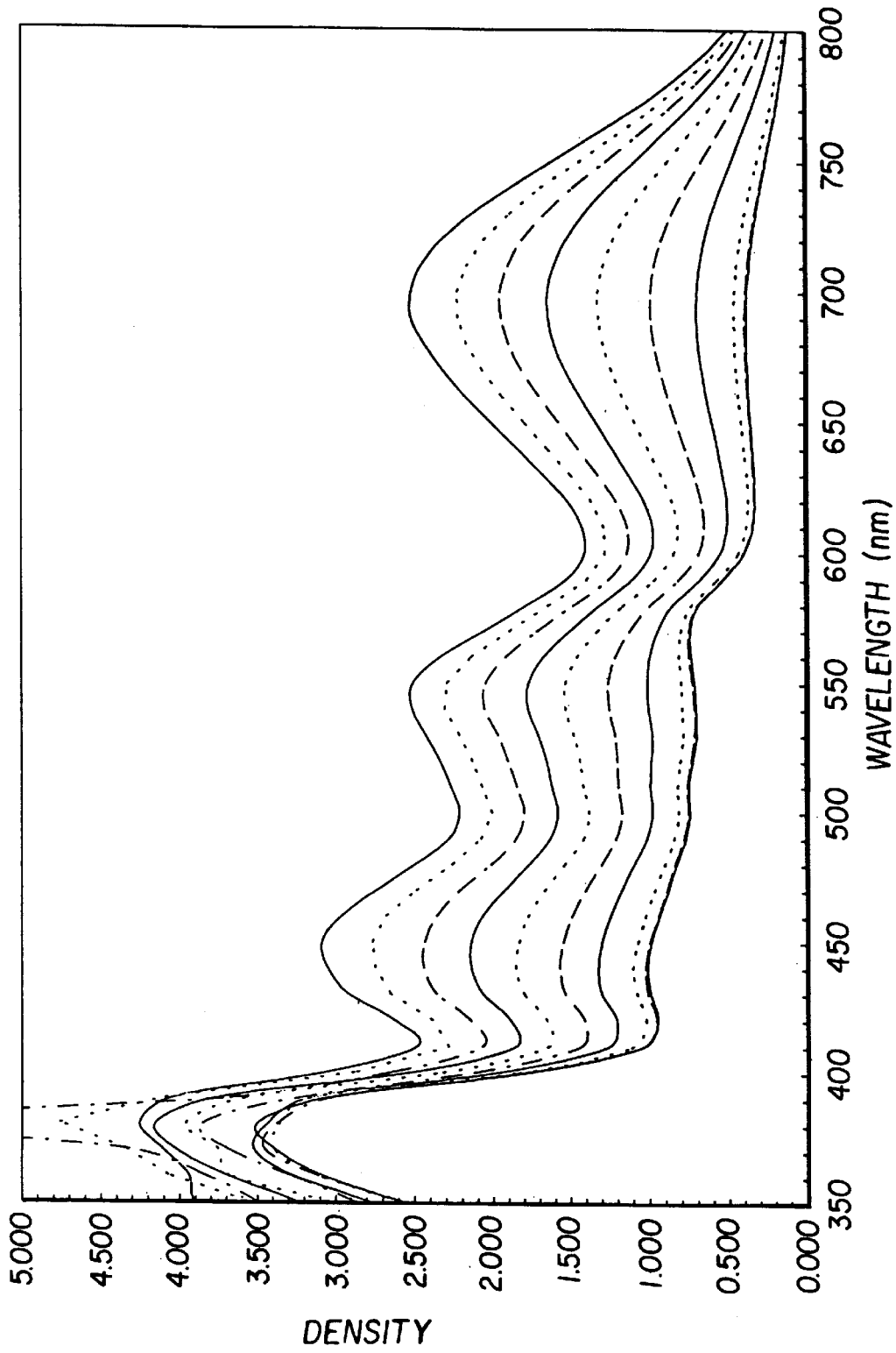
FIG. 3 illustrates the spectral density of a particular first film type resulting from various neutral or "gray" level exposures.
Figure 4:
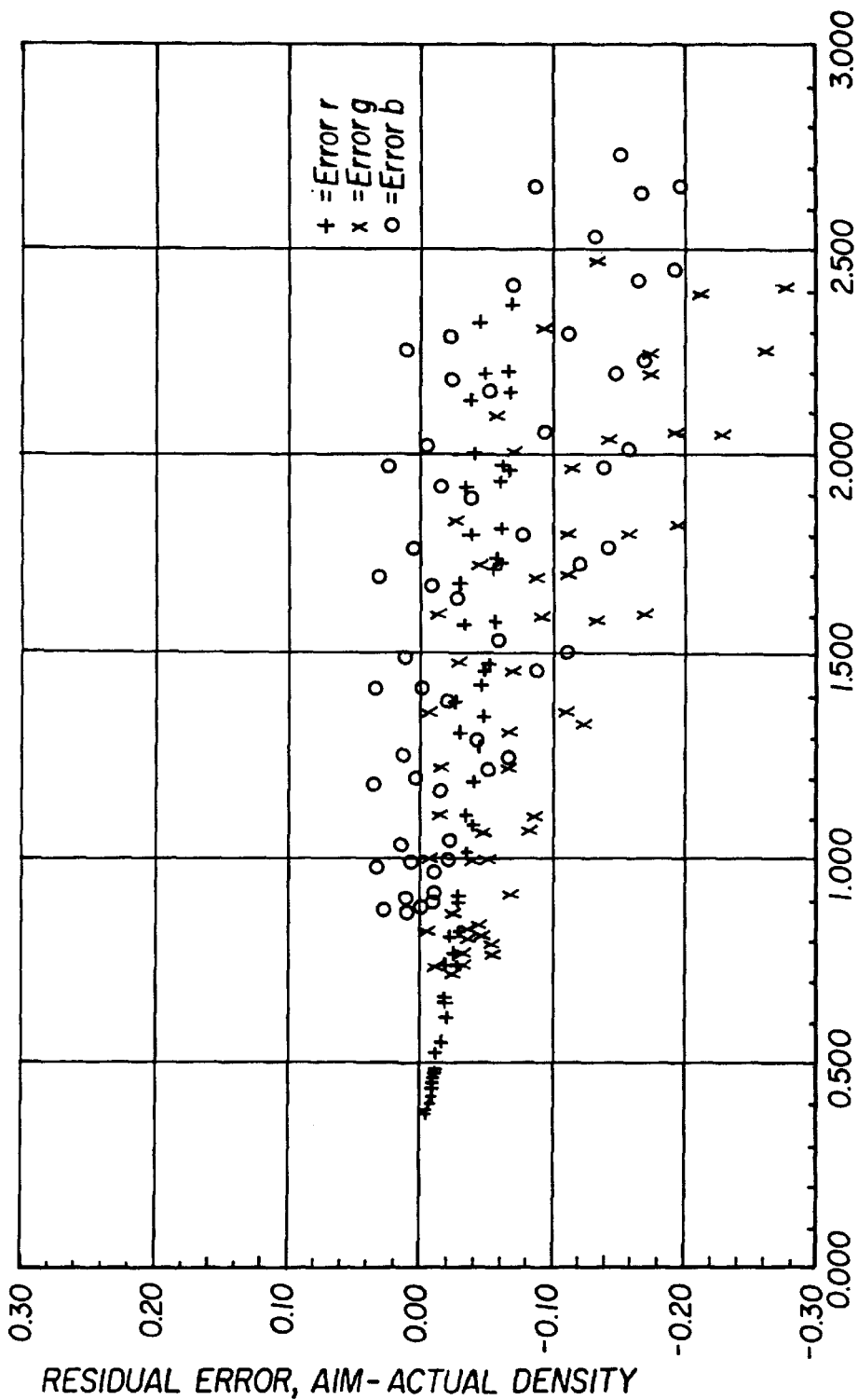
FIG. 4 illustrates errors in color detection for each of red ("r"), green ("g") and blue ("b") color channels, when the actual scanner sensitivity from FIG. 2 is used in scanning the film type of FIG. 3.

Referring now to FIG. 2, the solid lines illustrate an aim scanner spectral sensitivity in each of the red, green and blue color channels ("Saim r", "Saim g" and "Saim b", respectively), which approximates a typical printing density spectral sensitivity. The dotted lines illustrate a typical actual scanner spectral sensitivity for each of the red, green and blue color channels ("Sactual r", "Sactual g" and "Sactual b", respectively) using a tri-linear sensor and a filtered tungsten lamphouse illumination source. FIG. 4 illustrates the degree of color error resulting from using the actual scanner sensitivity of FIG. 2 with a first film type (the transmittance spectra for which is shown in FIG. 3 at various neutral densities). Color error is determined as described below.

Referring to FIG. 2, there are 3 color channels for each of the two curve sets. S(i,l) will be used to denote the spectral sensitivity of the $i^{th}$ channel of the set. FIG. 3 shows the spectral density of 10 neutral exposure patches from a particular type of color negative film (film TYPE 1), one curve for each patch. The spectral transmittance of the $j^{th}$ color patch will be denoted by T(j,l). In this Figure, the spectral density of the 10 color patches shown resulted from variation in neutral, or gray, exposure to the film. However, in the following results, 70 patches in total have been used in the calculations, representing different colors and varying levels of exposure. The scanner used was of a type disclosed in U.S. Pat. No. 5,099,359. For each channel and color patch, the transmittance is calculated as follows:

$$\tau(i, j) = \frac{\int S(i, \lambda)T(j, \lambda)d\lambda}{\int S(i, \lambda)d\lambda}$$

The corresponding density, computed as the base-10 logarithm of the transmittance, is then:

$$D(i,j) = -\log 10(\tau(i,j))$$

For an aim scanner spectral sensitivity (denoted by "aim" subscript), the aim spectral transmittance for each channel and patch can be computed as:

$$\tau_{aim}(i, j) = \frac{\int S_{aim}(i, \lambda)T(j, \lambda)d\lambda}{\int S_{aim}(i, \lambda)d\lambda}$$

And the aim density value of each channel and patch is:
$D_{aim}(i,j) = -\log 10(\tau_{aim}(i,j))$ A set of actual scanner spectral sensitivities is denoted (using subscripts "actual"), and the scanner transmittance and density values for each channel and patch similarly calculated. The error in density between the aim and the actual response for each channel is:

$$D\text{error}(i,j) = D\text{actual}(i,j) - D\text{aim}(i,j)$$

Figure 5:
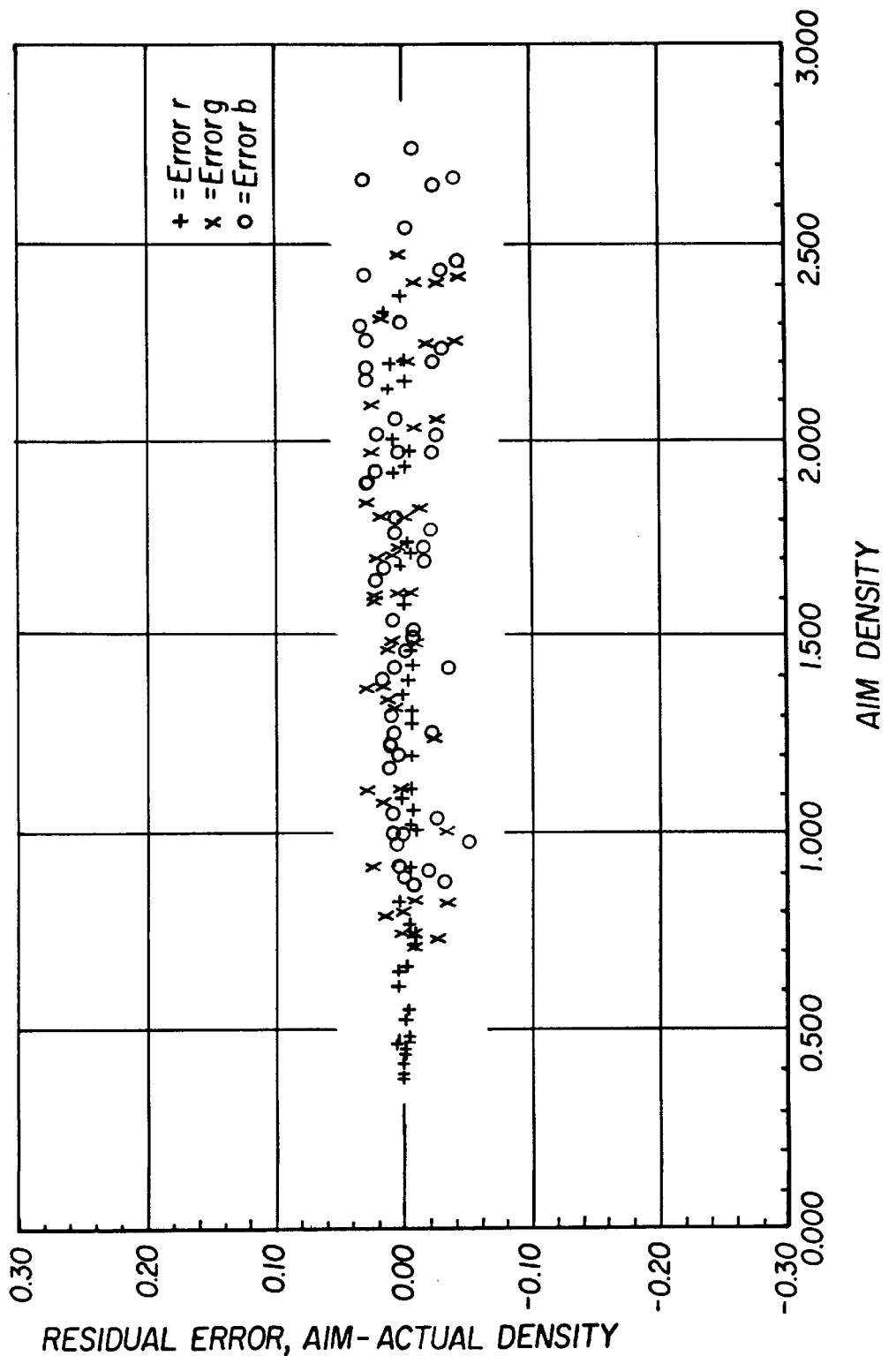
FIG. 5 is similar to FIG. 4 but illustrates the errors following a mathematical film calibration.

A plot of the error for the patches described above from film TYPE 1, using the actual scanner spectral sensitivity (dotted lines) and aim scanner system spectral sensitivity (solid lines) as shown in FIG. 2, results in the graph of FIG. 4. Previously, once a scanner sensitivity is achieved which is close enough, the remaining error is reduced by mathematical calibration (usually referenced in the art as "color calibration"). That is, a mathematical model is postulated which transforms the actual density values such that the residual error in density between the mathematically calibrated actual and aim response is minimized. Mathematical calibration models can range from simple linear models to complex, non-linear ones. Suitable mathematical calibration models, such as a linear regression, are well known. FIG. 5 was derived in the same manner as FIG. 4, but shows the residual error after mathematical calibration. The mathematical calibration model used was a relatively simple 3×3 matrix plus an offset resulting from multiple-linear regression.

Figure 6:
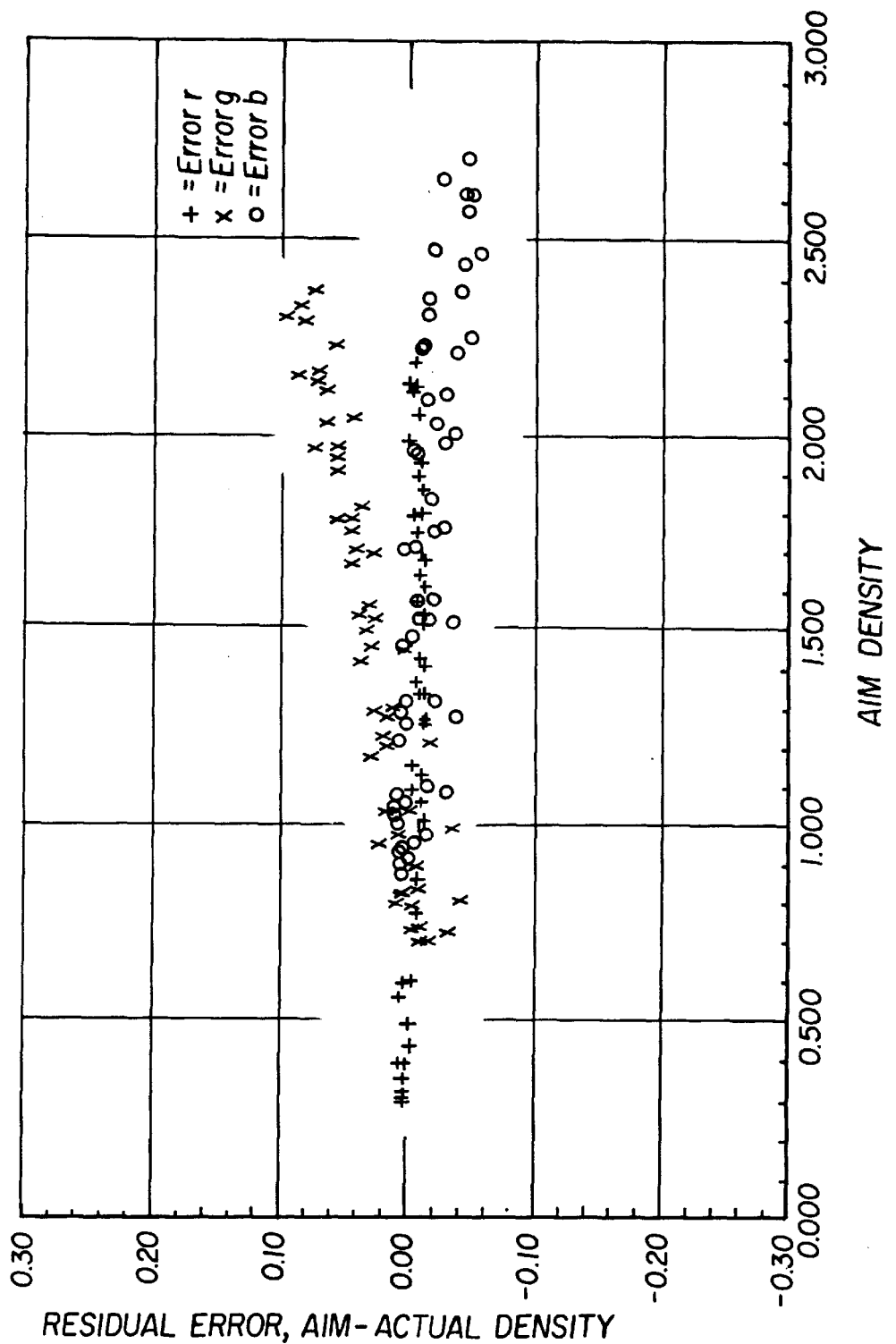
FIGS. 6 and 7 are similar to FIG. 5 but in which different second and third film types were used with same scanner sensitivity and mathematical calibration used in FIG. 5.
Figure 7:
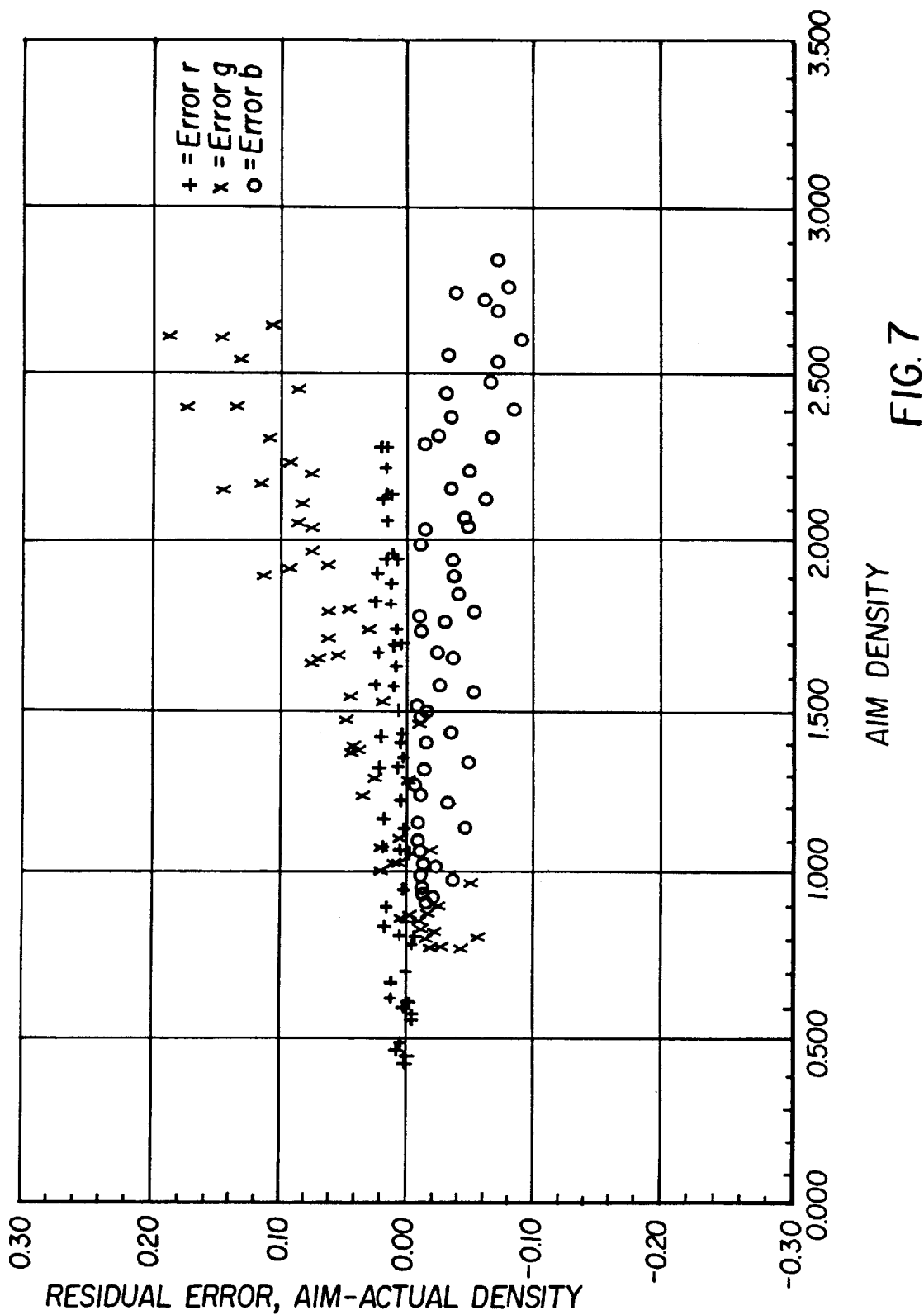

While some reduction in error is obtained from mathematical calibration, it will be seen from FIG. 5 that residual error, even with mathematical calibration, is still large. After such mathematical calibration, residual error was again determined in the same manner as in connection with FIG. 5, but using different color negative film types referenced herein as TYPE 2 and TYPE 3 films. The resulting error plots are shown in FIG. 6 (TYPE 2 film) and FIG. 7 (TYPE 3 film). Note that with such films, even in a mathematically calibrated scanner, color errors become very large. Thus, it is seen that color errors are unsatisfactorily large when a scanner actual and aim spectral sensitivities are not accurately matched.

Figure 8:
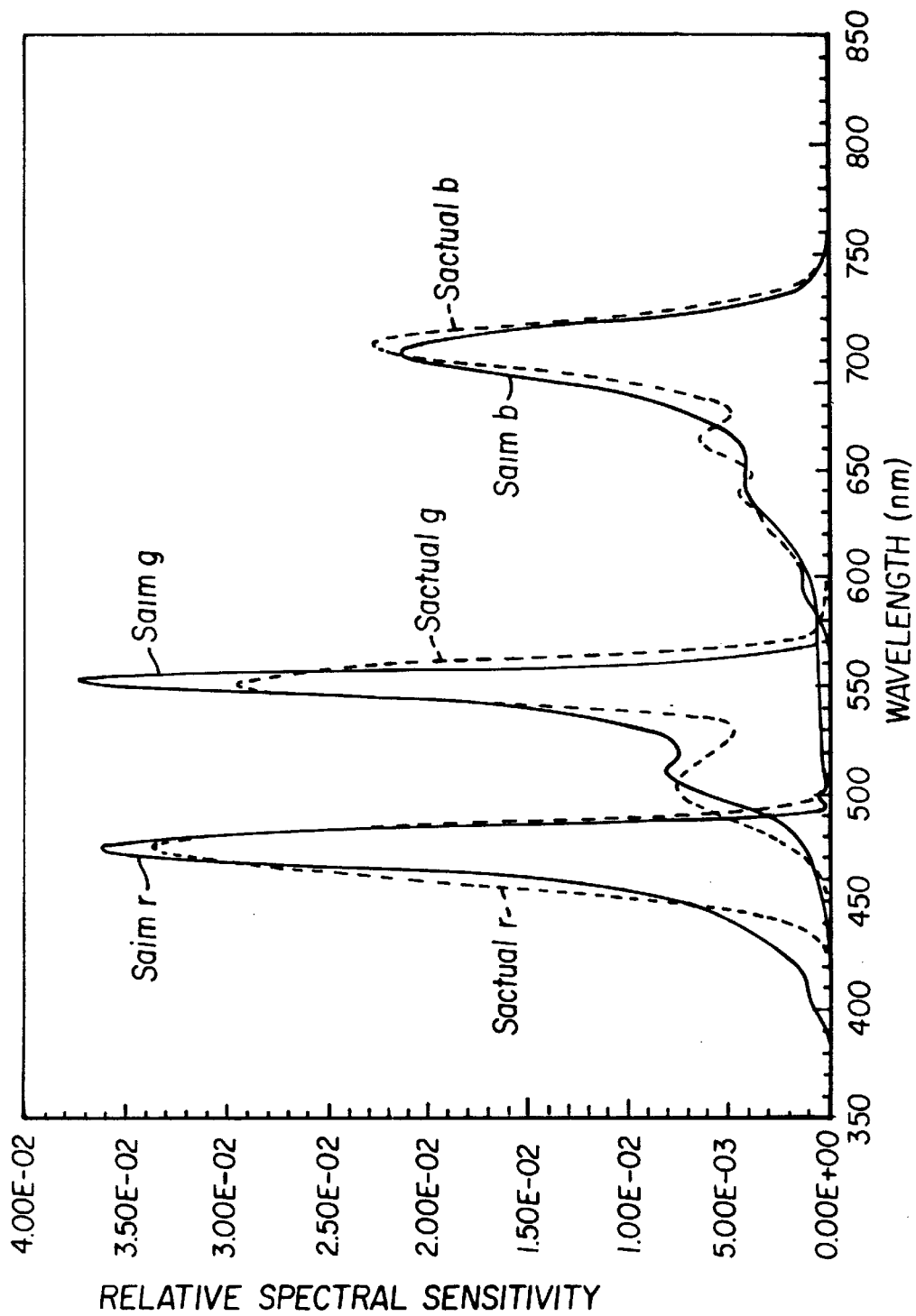
FIG. 8 is similar to FIG. 2 but illustrates an actual scanner spectral sensitivity (dotted lines) which is obtained in a scanner of the present invention.
Figure 9:
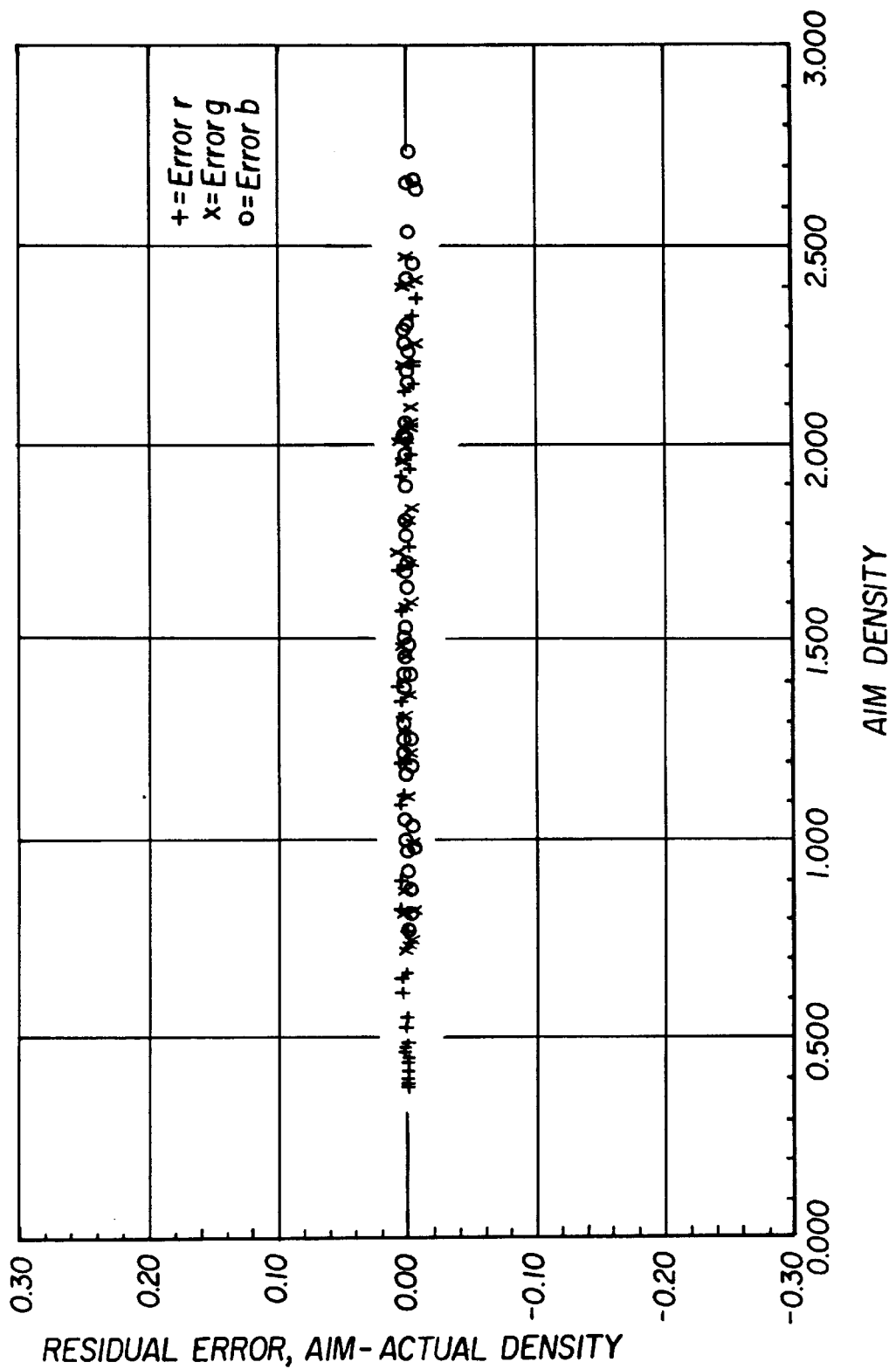
FIG. 9 is similar to FIG. 5 but illustrate the color errors resulting from scanning the first film type with a scanner having the actual scanner spectral sensitivity of FIG. 8.
Figure 10:
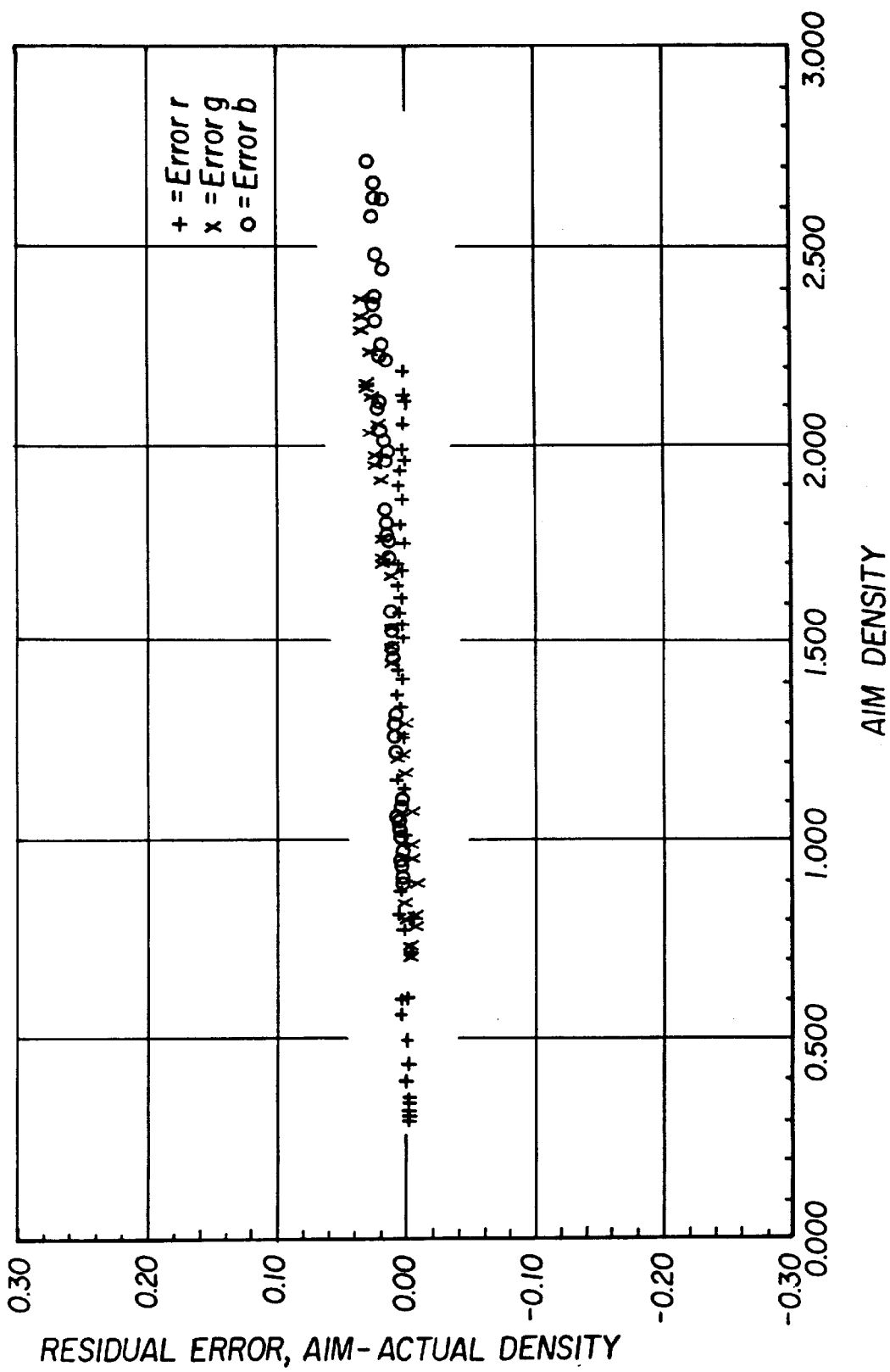
FIGS. 10 and 11 are similar to FIG. 9 but illustrate the color errors resulting from scanning the second and third film types using the same scanner mathematically calibrated for the first film type.
Figure 11:
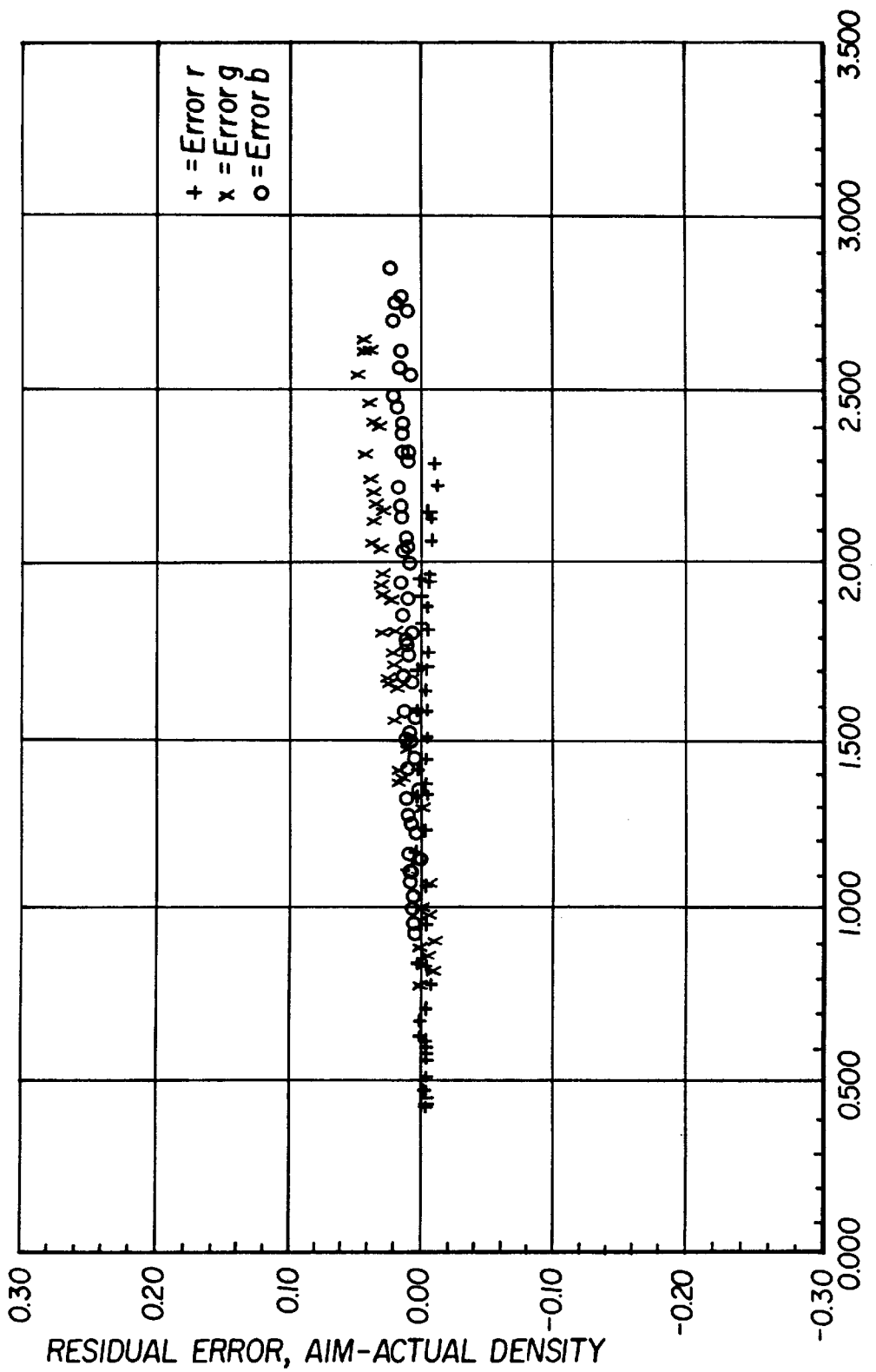

Referring now to FIG. 8, this is essentially the same as FIG. 2 but illustrates a different actual scanner spectral sensitivity (dotted lines) than that of FIG. 2, as compared to the same aim scanner spectral sensitivity (solid lines) shown in FIG. 2. As can be seen from a comparison of FIGS. 8 and 2, the actual and aim scanner spectral sensitivities are more closely matched in FIG. 8. A scanner of FIGS. 17–19 was set to obtain the aim scanner spectral sensitivity, using a scanner spectral calibration method of the present invention, described in more detail below. After such spectral calibration, mathematical calibration was performed in the same manner as previously described using film TYPE 1 in connection with FIG. 5, and the color error again plotted in the same manner as in FIG. 5. The resulting color error plot is FIG. 9. It is evident from a comparison of FIGS. 9 and 5 that a scanner of the present invention, which has been spectrally calibrated, has dramatically improved color accuracy. Furthermore, using the same procedure described above in connection with FIGS. 6 and 7, but with the spectrally calibrated scanner which was mathematically calibrated for film TYPE 1 to obtain FIG. 9, error plots for films of TYPE 2 (FIG. 10) and TYPE 3 (FIG. 11) were again obtained. Comparing FIGS. 11 and 11 with FIGS. 6 and 7, respectively, it is apparent that color errors are substantially reduced for other film types, using a spectrally calibrated scanner of the present invention versus color errors resulting from using a typical prior art scanner.

Figure 12:
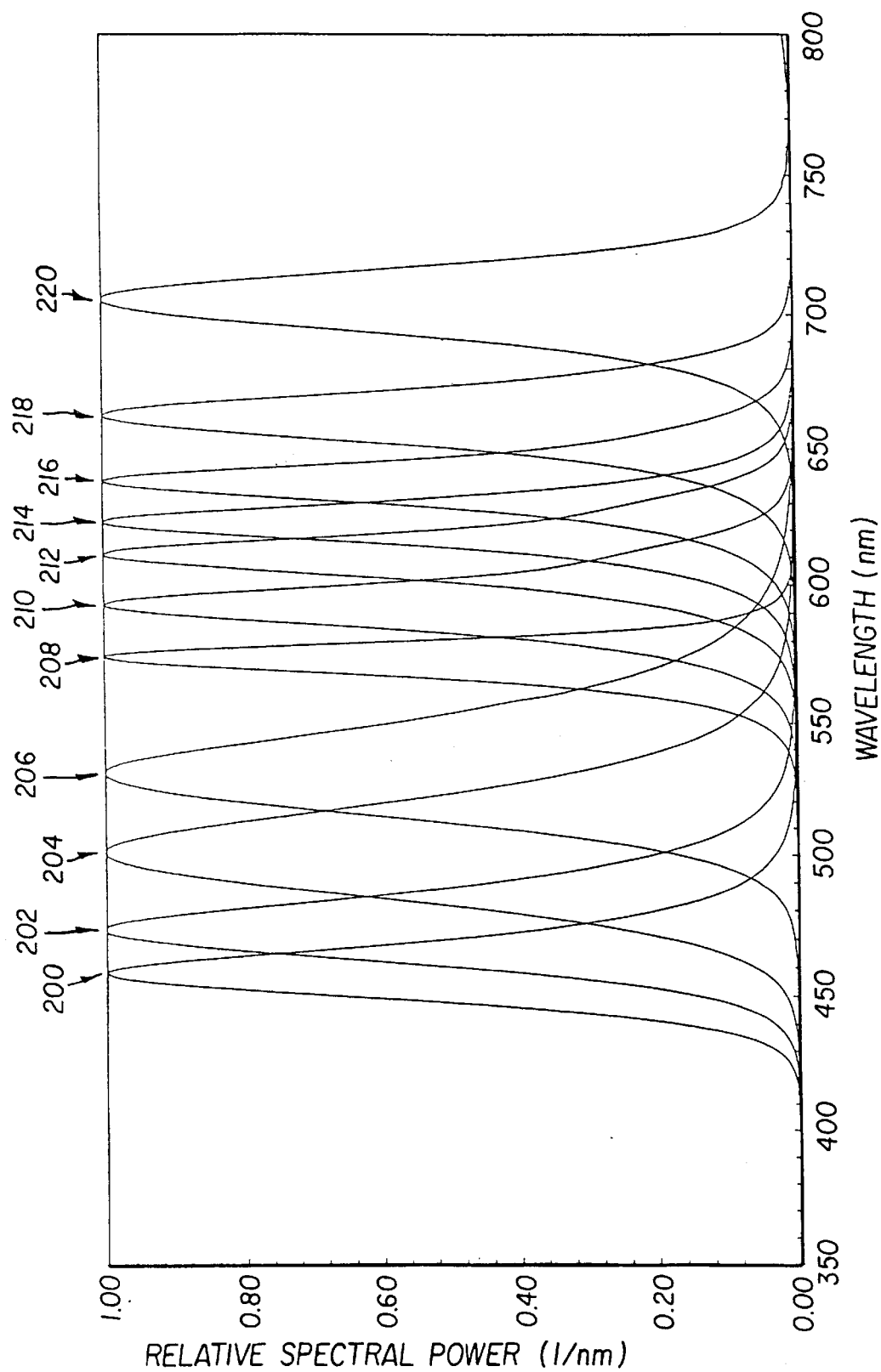
FIG. 12 illustrates the peak normalized spectral power of various Light Emitting Diodes ("LEDs") which can be used in a scanner of the present invention.

Scanners of the present invention are preferably constructed using various sets and sub-sets of solid state light emitting devices in the form of LEDs. LEDs have low power consumption, are compact, produce little heat, and the exposure provided by them can be readily varied by adjusting the time they are powered ON or the power supplied to them while ON. Furthermore, the emission spectrum of an LED is often very narrow or can be confined to a narrow band with a sharp cutoff filter if necessary, and LEDs with peak emissions throughout the visible spectrum are readily available. This is illustrated in FIG. 12 which shows the peak normalized power from LEDs with approximate emission peaks at 458 nm, 474 nm, 500 nm, 530 nm, 574 nm, 592 nm, 609 nm, 622 nm, 635 nm, 660 nm and 704 nm. The foregoing LEDs were obtained from the sources listed in Table 1 below:

TABLE 1

| APPROXIMATE EMISSION PEAK WAVELENGTH | SUPPLIER | PART NO. |
| --- | --- | --- |
| 704 nm | MARKTECH (Latham NY) | MT80 |
| 660 | MARKTECH | MT5000 |
| 635 | HEWLET-PACKARD | HLMP-DG10 |
| 622 | HEWLET-PACKARD | HLMP-DH10 |
| 609 | HEWLET-PACKARD | HLMP-DJ10 |
| 592 | HEWLET-PACKARD | HLMP-DL10 |
| 574 | TOSHIBA | TLGA-183P |
| 530 | NICHIA (Japan) | NSPG-500S |
| 500 | NICHIA | NSPE-590S |
| 474 | NICHIA | NSPB-500S-WR |
| 458 | NICHIA | NSPB-500S-VQ |

Figure 13:
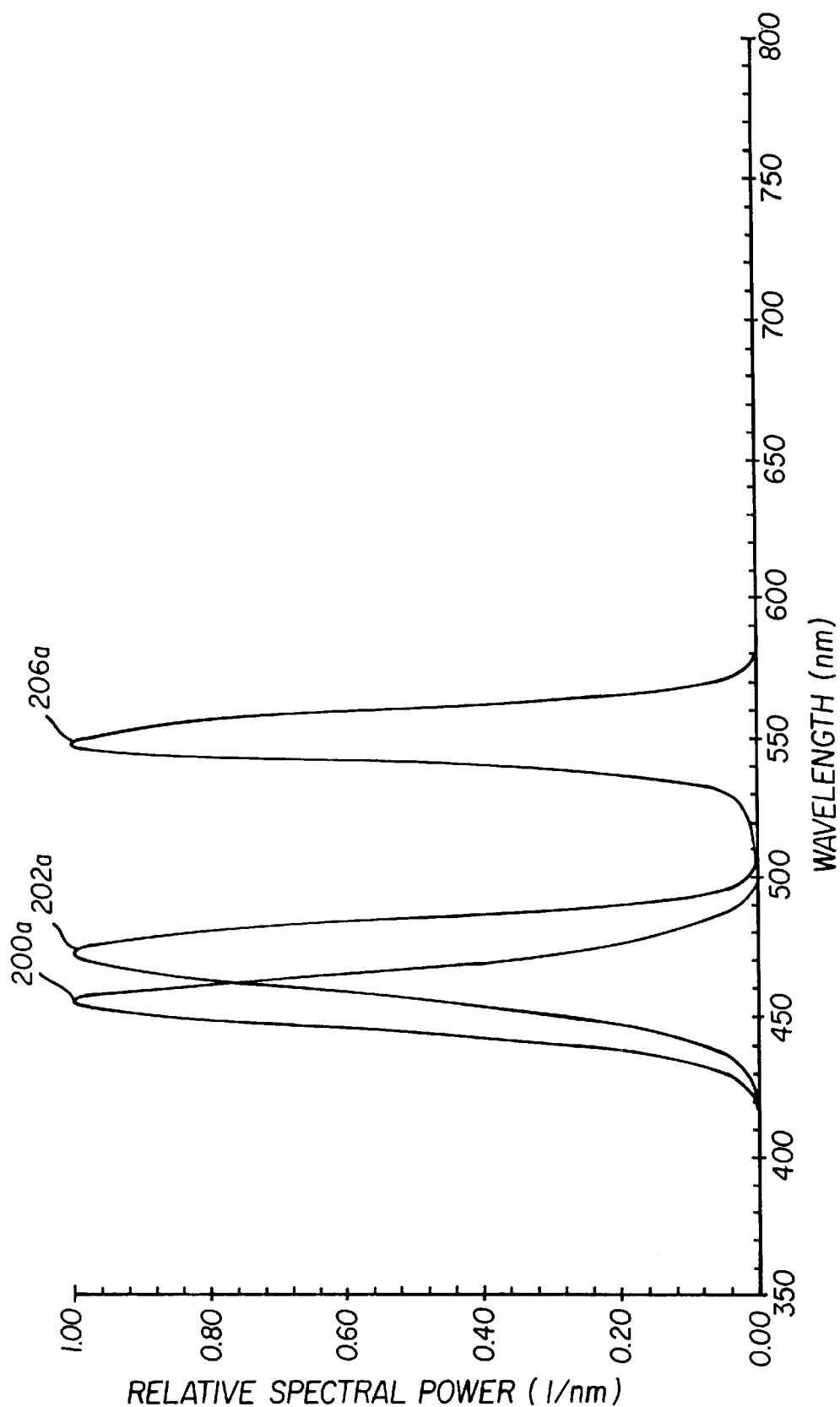
FIG. 13 illustrates the peak normalized spectral power of three of the LEDs of FIG. 12 after filtering.

To obtain the actual scanner spectral sensitivity of FIG. 8 (dotted lines), not only is a type of LED with a peak emission (and integrated spectral output) in each color channel used, but the red and green channels use multiple types of LEDs. These LED types for the blue, green and red color channels have the peaks 200, 202, 204, 206, 208, 210, 212, 214, 216, 218 and 220 shown particularly in FIG. 12. However, a fixed short wave pass filter (filter 230 in FIG. 17) is used with the LEDs 200, 202 and a fixed band pass filter (filter 240 in FIG. 17), with the LED 206 to obtain the corresponding narrower curves 200a, 202a and 206a illustrated in FIG. 13. Suitable such filters are available from Optical Coating Laboratories, Incorporated, California. The short wave pass filter used provided a cut-off essentially at 485 nm while the bandpass filter was centered essentially at 550 nm with a 25 nm wide pass band.

Figure 14:
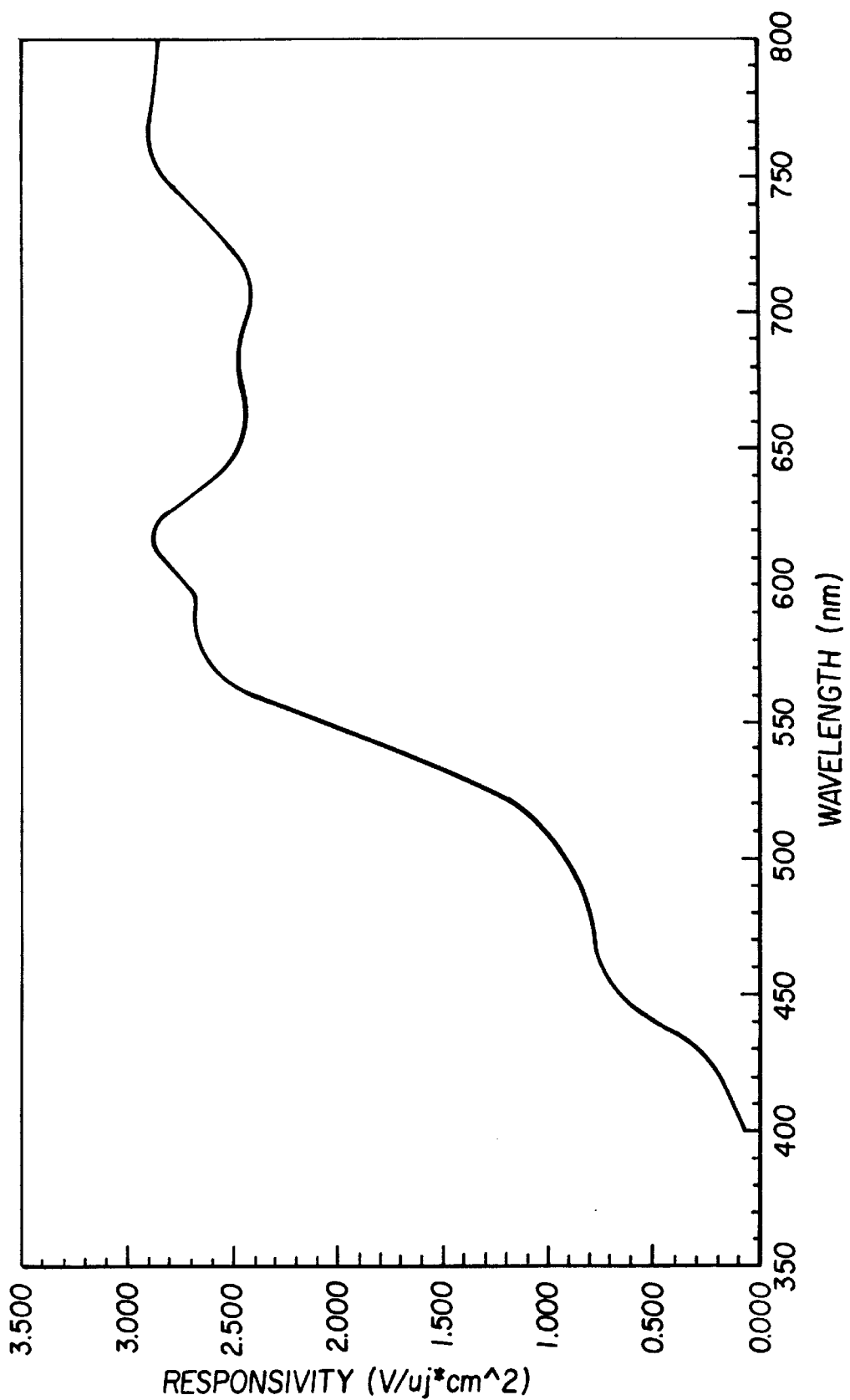
FIG. 14 illustrates the spectral responsivity of a Charge Coupled Device ("CCD") sensor used in the scanner of the present invention.
Figure 15:
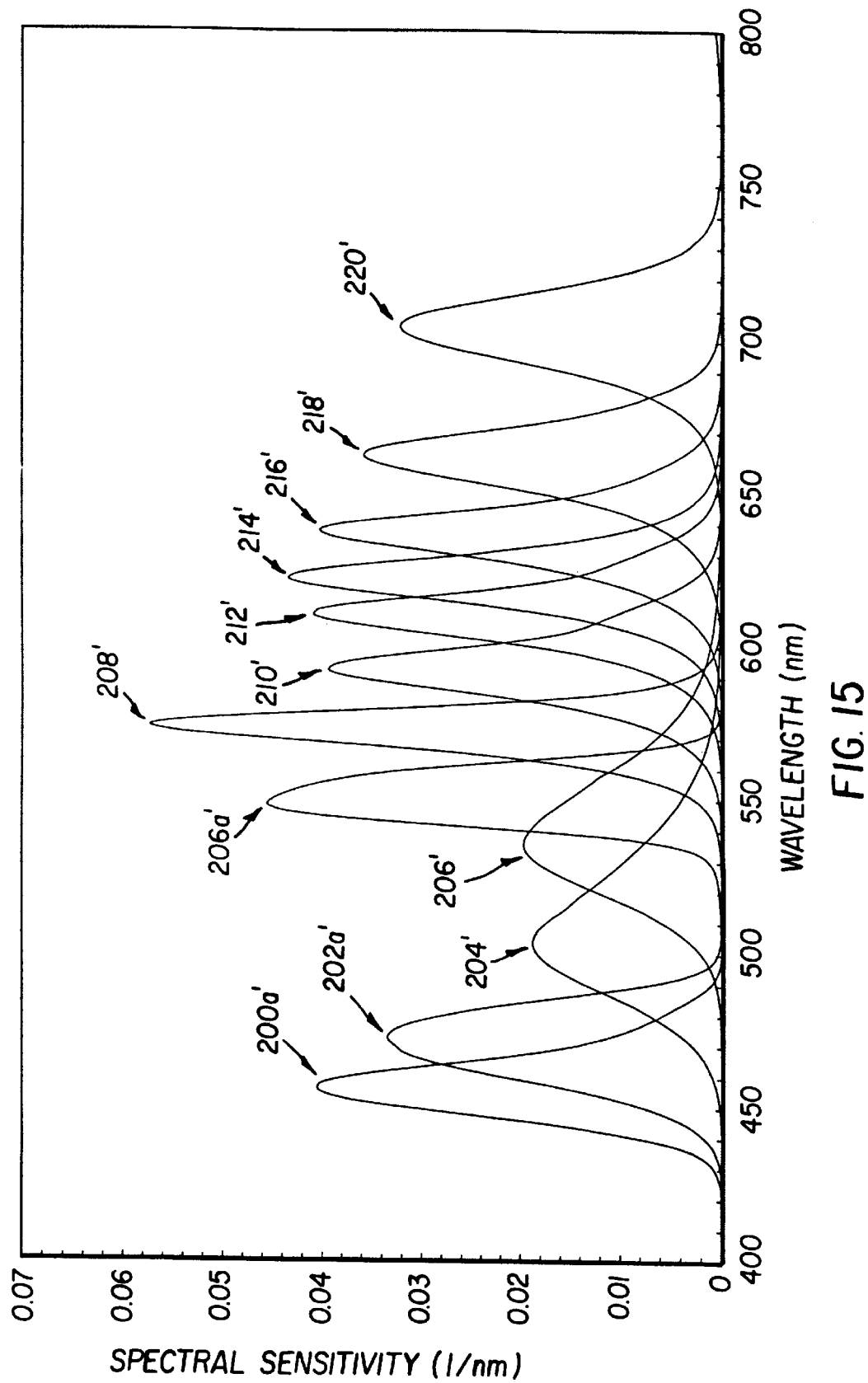
FIG. 15 illustrates the spectral sensitivity of a scanner using the individual LEDs of FIG. 12 and FIG. 13, when used in combination with the CCD of FIG. 14.

However, to obtain the scanner spectral sensitivity resulting from use of any selected sets of LEDs, the LED emission spectra has to be multiplied by the sensor spectral sensitivity. A typical Charge Coupled Device ("CCD") sensor has a spectral sensitivity (sometimes referenced as responsivity, or similar, in this application) as shown in FIG. 14. FIG. 14 in particular, is for a KAF-1600 full-frame CCD, available from Eastman Kodak Company, New York. It will be assumed that no other elements significantly contribute to scanner spectral sensitivity other than the illumination source and the sensor. If a filtered sensor is used, the sensor sensitivity can be considered as the sensitivity of a sensor alone combined with the filter. Other elements, such as a scanner lens system, tend to have little significant effect on scanner spectral sensitivity. However, if such other components are used which might have a significant effect, this should be taken into account in a similar manner as the CCD sensitivity. The resultant spectral sensitivities of LED emission spectra of FIGS. 12 and 13 when combined with the CCD spectral responsivity of. FIG. 14 are shown in FIG. 15 (which is area normalized for each LED type). In FIG. 15 scanner spectral sensitivity peaks 200a', 202a', 204', 206', 206a', 208', 210', 212', 214', 216', 218' and 220' correspond with the LED peaks 200a, 202a, 204, 206, 206a, 208, 210, 212, 214, 216, 218 and 220 respectively.

Figure 16:
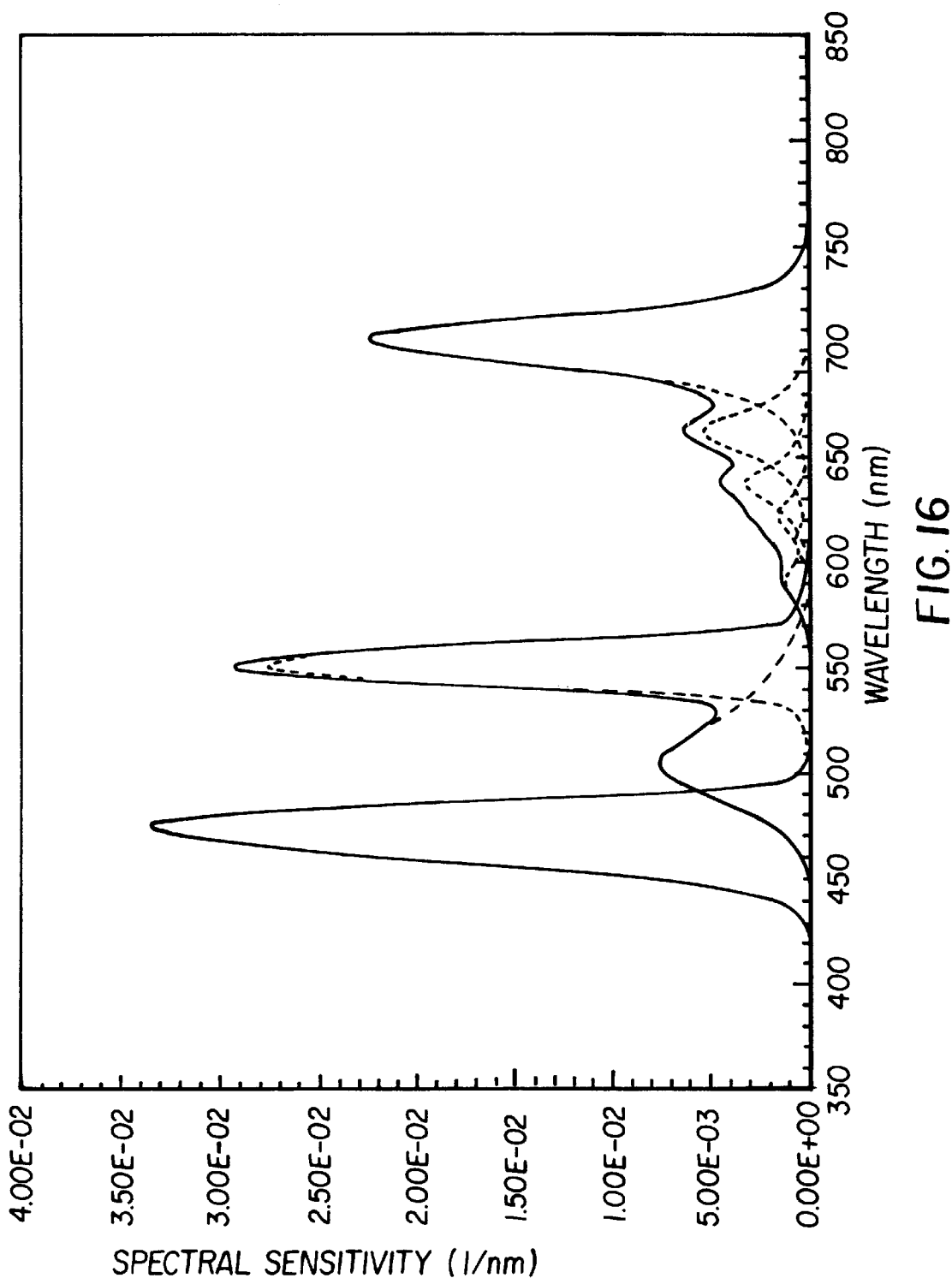
FIG. 16 illustrates how the present invention can be used to realize a scanner whose spectral sensitivity is close to the aim spectral sensitivity of FIGS. 2 and 8 using selected LEDs of FIG. 12, filtered LEDs of FIG. 13 and the CCD of FIG. 14.

The actual scanner spectral sensitivity is a sum of the scanner spectral sensitivity provided by each type of LED as sensed by the CCD. It will be apparent from FIGS. 15 and 16 though, that the actual scanner spectral sensitivity of FIG. 16 (indicated by solid lines) can only be obtained if the exposure provided by each color channel is controlled, and the exposure of different types of LEDs corresponding to a single given channel is also controlled. A suitable scanner of the present invention which provides such control is shown in FIGS. 17–19.

Figure 17:
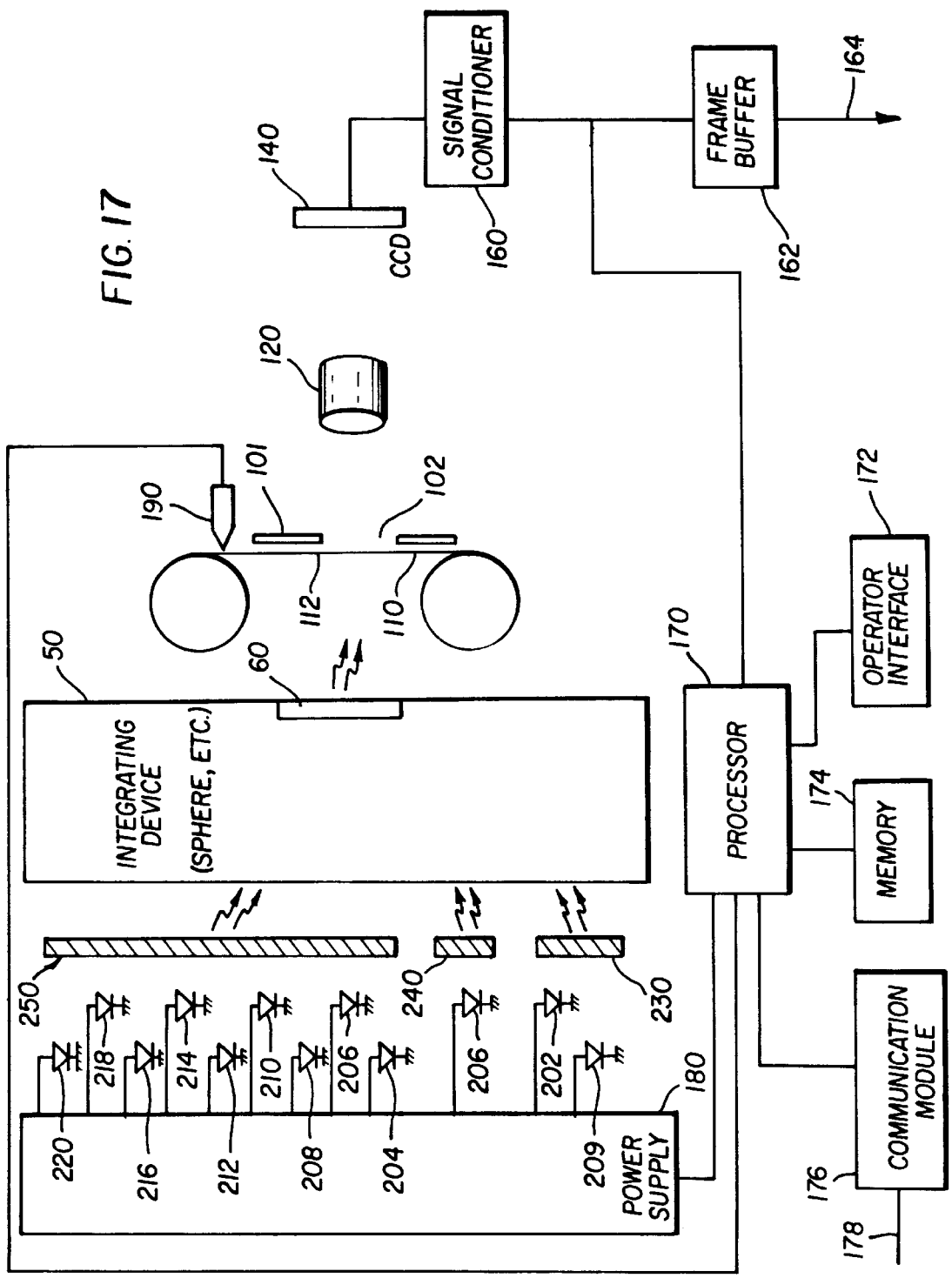
FIG. 17 is a schematic of a scanner of the present invention.
Figure 18:
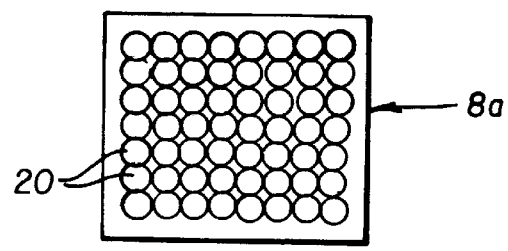
FIGS. 18 and 19 illustrate further details of the illumination source of the scanner of FIG. 17.
Figure 19:
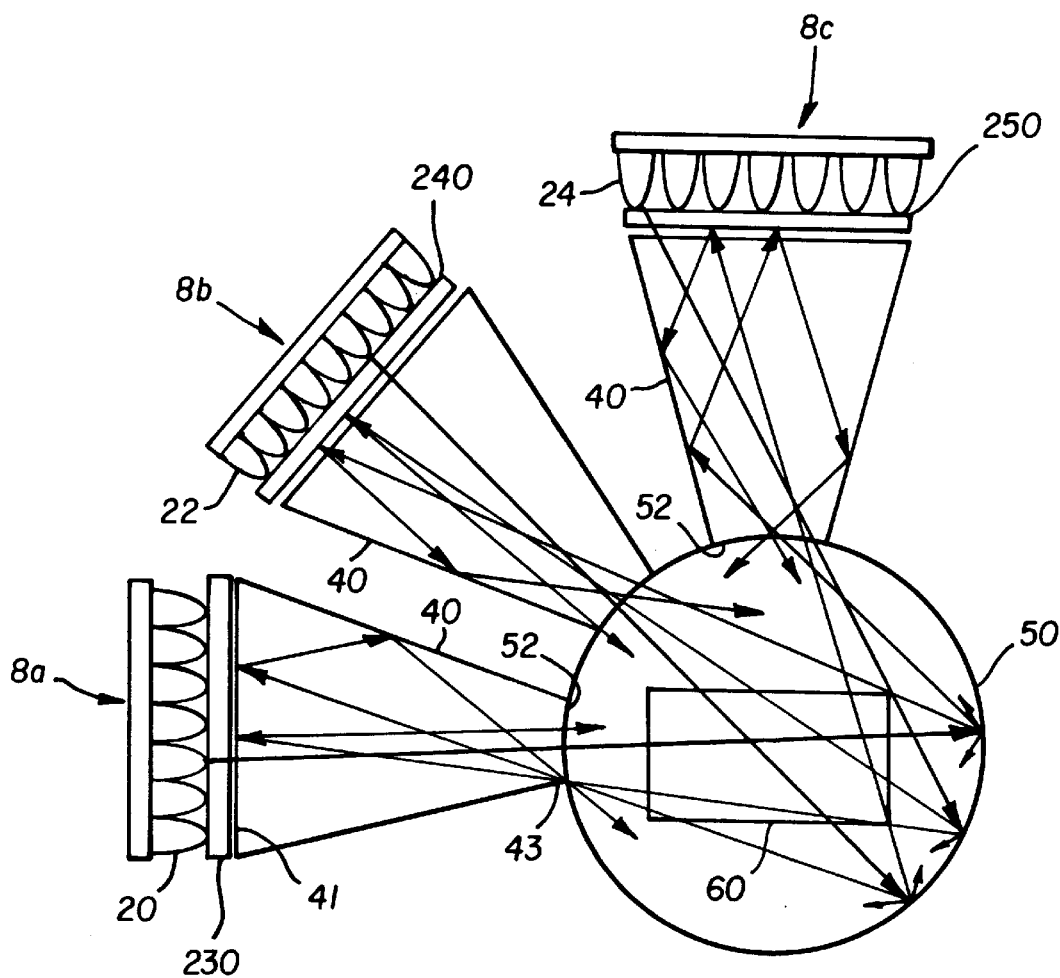

Referring to FIGS. 17–19, the scanner has a sensor assembly which includes a CCD sensor 140, signal conditioner 160 (which includes an analog/digital converter), and a frame buffer 162. Frame buffer 162 receives each frame from the CCD and provides an output on line 164 in the form of a single image frame signal having r, g, b color channel components (respectively representing red, green and blue spectral regions) for each scanned image. As an alternative, frame buffer 162 could deliver an image frame signal having cyan, magenta and yellow color channel components (respectively representing subtractive combinations of the red, green and blue spectral regions), or some other output color channel configuration could be used. Sensor 140 is positioned to receive light through a lens assembly 120 from an image 112 on a media such as a transparent film 110. Each image of film 110 can be positioned in sequence past an opening 102 of a media holder in the form of a film gate 101. An illuminator provides the illumination for each image 112 which is modulated by the image before falling on sensor 140. The illuminator is shown in more detail in FIGS. 18 and 19, and includes a plurality of assemblies 20, 22, 24 of LEDs mounted on respective circuit boards 8a, 8b, and 8c. Assembly 20 is composed of LEDs 200, 202, assembly 22 is composed of multiple LEDs 206, while assembly 24 is composed of LEDs 204, 206, 208, 210, 212, 214, 216, 218, and 220. Each assembly is in the form of a two-dimensional array in the same manner as shown for assembly 20 in FIG. 18.

Each assembly of LEDs is oriented to direct light from their LEDs into an inlet end 41 of respective non-imaging optic light concentrator cones 40 (the light of the assemblies 20, 22 first passing through respective filters 230, 240 as described above, while light from assembly 24 first passes through an infra-red filter 250). Cones 40 direct their light into a hollow light integrator chamber 50. The inside of integrating chamber 50 is made of a diffuse reflective material so that a relatively uniform beam of light leaves an exit port 60 to illuminate an image 112 to be scanned. Concentrator cones 40 may be hollow or solid, as is known, and may have a circular, elliptical, or compound elliptical cross-section. Integrating chamber 50 may be spherical or similar shape, such as a prolate spheroid shape. That is, a sphere which has one axis elongated (in the present case, the elongation being along the imaging optical axis). An oblate spheroid is formed by rotating an ellipse about its major axis, which in this case will be aligned with an imaging optical axis of the scanner (defined by a centered line extending vertically into the exit port 60 as viewed in FIG. 19, and perpendicularly and centered through image 112, lens assembly 120 and sensor 140). The imaging optical axis is perpendicular to an axis of cone 40. One such concentrator and light integrator arrangement is described in U.S. patent application Ser. No. 08/979,890 entitled "Illuminator with Light Source Arrays" filed Nov. 26, 1997 which is incorporated herein by reference. It will be appreciated though, that other arrangements are possible. For example, all of the LEDs could simply be placed on the inside surface of the light integrator 50 and the concentrator cones dispensed with. However, such an arrangement is less desirable at least in situations where at least one type of LED must be filtered. Also, light integrators with linear light output ports and their associated light input arrangements, could be used with the LEDs described above in the case where a linear sensor is being used in the scanner.

Note that in the case of the scanner of FIG. 17, light integrator 50 serves not only to improve light intensity uniformity across the illuminated region of the image 112, but serves the additional purpose of improving spectral uniformity from the LED assemblies 20 and 24. This is so since, as will be described below typically the different LED types will be turned on simultaneously. Due to the multiple diffuse reflections, which take place within integrating chamber 50 before light can exit port 60, spectral uniformity is improved.

It will be appreciated that the LEDs are arranged in the assemblies shown to satisfy filtering requirements, and an assembly does not necessarily correspond to a given "set" of LEDs. In the construction of the illumination source described, LEDs 200, 202 constitute the set of LEDs used to construct a blue color channel for color negative film, while LEDs 204 from assembly 24 and LEDs 206 from assembly 22 together are used to construct a green color channel for color negative film. LEDs 210–220 are used to construct the red color channel for color negative film while LED 206 in assembly 24 is not used for color negative film. Each type of LED within a set constitutes a sub-set. This can be seen better from Table 2 below.

The scanner also includes a variable power supply 180 to drive all of the LEDs. Power supply 180 is capable, under control of a processor 170, of adjusting the total relative exposure provided by the different LED assemblies 20, 22, 24. Since exposure is represented by total output power over time, power supply 180 can control such relative exposure by controlling the ON time of the LED sets or controlling the power supplied to them while in the ON state. Preferably the ON time control is used, since variations in power can cause small variations in LED spectral emission curves. Power supply 180 can also independently control each sub-set of different spectral output LEDs within a given channel. Again, this can be time or power control, but preferably the former. Thus, power supply 180, under control of processor 170, can alter the relative exposures provided by the LED sets to control color balance, and independently control each of the sub-sets within a set to control scanner spectral sensitivity within each corresponding color channel.

Power supply 180 is controlled by a processor 170 which communicates with a memory 174, a communication module 176, and can receive operator input through operator interface 172 (such as an operator indication of the media type to be scanned, for example slides or color negative). Processor 170 may be a general purpose microprocessor suitably programmed to carry out the steps required of it, or may be any equivalent combination of hardware and/or software. Memory 174 may be any suitable magnetic, optical or solid state memory device. For example, memory 174 may be a magnetic or optical disk drive. Communication module allows the scanner to communicate through a telephone line or network connection (optical, wired or wireless) with a remote host. By "remote" in this context is referenced a host which is at least in a different room of the same building in which the scanner is located, and more typically will be in a different building which might be at least one, five, or ten or more miles from the scanner. Processor 170 further receives input signals from a code reader 190 which can read a magnetic and/or optical machine readable code from film 110. Processor 170 also receives an output from sensor 140 and spatially averages the exposure from each sub-set of LEDs over all pixels of sensor 140, such that the signal from each can be measured and adjusted as described below.

Memory 174 can carry different control data sets to instruct processor 170 how to correctly control the exposures provided by the different LED sets and different sub-sets within each set, for different media so that a desired aim scanner spectral sensitivity will be obtained for that media. Memory 174 can further store mathematical calibration data. For example, memory 174 can carry a data set for typical color negative film as well as a data set for a typical slide, each of which will have substantially different aim scanner spectral sensitivities, as discussed above.

Figure 20:
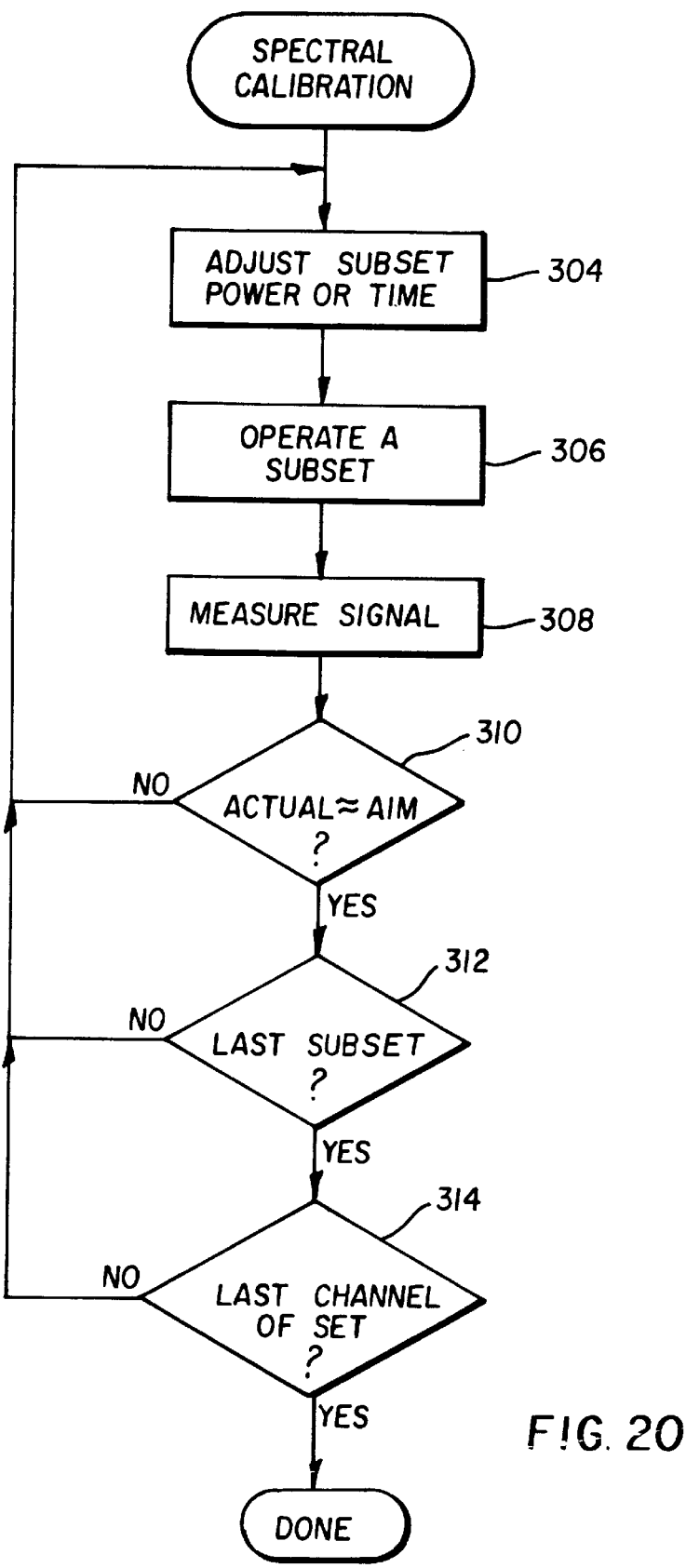
FIG. 20 is a flowchart illustrating a scanner spectral calibration method of the present invention.

Prior to operation of the scanner described above, it is first color both balanced and spectrally calibrated. This can be accomplished in a manner illustrated in the flowchart of FIG. 20. First, the power or ON time for a sub-set (preferably ON time) is adjusted (304) initially by reference to a look-up table stored in memory 174 for the particular type of media to be scanned. The same subset is then operated (306) using this value. The resulting signal from CCD sensor 140 is measured (308) and spatially averaged therein. This actual signal is then compared (310) with an aim value for that sub-set, stored in memory 174. If the actual and aim values are not within a predetermined tolerance, then the foregoing steps are repeated, as necessary, until the actual value and the aim value are within the predetermined tolerance. A typical tolerance would be 3 to 5%. If this is not the last subset (312) for a given color channel, the foregoing procedure is repeated to calibrate each sub-set of that channel in turn. Once the last subset of one color channel has been calibrated (314), the process is repeated for the remaining color channels in turn. It will be appreciated of course, that the steps need not be carried out in the foregoing sequence. For example, exposure measurements from all the sub-sets might first be acquired, following which the comparison and adjustment (as necessary) for all the sets then takes place. Mathematical calibration of the scanner can then be carried out in a known manner.

For the particular scanner described above, the following relative exposure contributions were used for color negative and color reversal slides:

TABLE 2

RELATIVE EXPOSURES FROM EACH LED TYPE FOR COLOR NEGATIVE FILM

| LED | Red Color Channel | Green Color Channel | Blue Color Channel |
| --- | --- | --- | --- |
| 704 nm | 0.6983 | 0 | 0 |
| 660 nm | 0.1469 | 0 | 0 |
| 635 nm | 0.0794 | 0 | 0 |
| 622 nm | 0.0344 | 0 | 0 |
| 609 nm | 0.0139 | 0 | 0 |
| 592 nm | 0.0271 | 0 | 0 |
| 574 nm | 0 | 0 | 0 |
| 530 nm | 0 | 0 | 0 |
| 500 nm | 0 | 0.3951 | 0 |
| 550 nm (BPF) | 0 | 0.6049 | 0 |
| 474 nm (SWP) | 0 | 0 | 1.0000 |
| 458 nm (SWP) | 0 | 0 | 0 |

TABLE 3

RELATIVE EXPOSURES FROM EACH LED TYPE FOR COLOR REVERSAL FILM

| LED | Red Color Channel | Green Color Channel | Blue Color Channel |
| --- | --- | --- | --- |
| 704 nm | 0.0056 | 0 | 0 |
| 660 nm | 0.0265 | 0.0018 | 0 |
| 635 nm | 0.0838 | 0 | 0 |
| 622 nm | 0.1648 | 0.0059 | 0 |
| 609 nm | 0.1510 | 0.0060 | 0 |
| 592 nm | 0.2895 | 0.0322 | 0 |
| 574 nm | 0.1840 | 0.1310 | 0 |
| 530 nm | 0 | 0.4667 | 0 |
| 500 nm | 0 | 0.2932 | 0.1138 |
| 550 nm (BPF) | 0.0948 | 0.0632 | 0 |
| 472 nm (SWP) | 0 | 0 | 0.8862 |
| 456 nm (SWP) | 0 | 0 | 0 |

Following spectral and mathematical calibration, an image can then be scanned by a method of the present invention. First, with film 110 in scanner, reader 190 can obtain an indication of the film type to be scanned from an optical and/or magnetic code on film 110. Alternatively, the operator can input such an indication through interface 172 after visually inspecting the film type directly, or inspecting the film container, packaging, or the like for indicia associated with the film which indicates the film type to the operator. Processor 170 can then automatically select an appropriate control data set from memory 174 in response to this indication, and control the exposure provided by each LED set and each sub-set within each set, in accordance with the selected control data set. In the scanner described, LED sets will be turned on in sequence (that is, one after the other) but with all sub-sets in a set (in particular six sub-sets of red set 24) being turned on simultaneously for color negatives (see Table 2). By the sub-sets being ON simultaneously means that they overlap in their ON times, it does not necessarily mean that all sub-sets of a given set are ON for the same time (since different ON times may be required to obtain the aim scanner spectral sensitivity). For each LED set then, a corresponding red, green or blue channel signal is detected by sensor 140. A synchronization signal is supplied by processor 170 to frame buffer 162, so that frame buffer 162 can identify each received frame as a blue, green or red color channel signal which it saves temporarily in an internal memory. These three so identified color frames are then combined by frame buffer 162 (which may be external of the scanner) and output as a single image frame signal having blue, green and red color channel components on line 164 for each scanned image 112. Each image frame signal on line 164 can then be stored, processed or transmitted, as desired.

Should it be desirable that information in the control data sets be changed due, for example, to change in desired aim scanner spectral sensitivity characteristics or due to an addition or change in film types for which it is desired to have a more specific control data set, new or modified control data information can be communicated to the scanner from a remote host through communication module 176. Such information could for example be supplied for a particular manufacturer's film so as to accommodate the particular characteristics of its films. If the manufacturer places an appropriate human readable identification in association with such a film, or places a suitable code on film 110 for reading by reader 190, the necessary illuminator control can be accomplished virtually automatically with little or no operator thought required. Additionally, processor 170 could be programmed to communicate through communication module 176 with a remote host when an indication of film type read by reader 190 or input by the operator through interface 172, does not correspond with any film type stored in memory 174. Film 110 could even have coded on it, the appropriate communication address where processor can reach a remote host with the new illuminator control data in this situation, eliminating the need for operator input of a telephone number or other communication address.

It will be appreciated though, that while the above scanner generates each color channel information sequentially, it is possible that these could be generated simultaneously using a color filter arrayed area sensor, or a filtered tri-linear sensor in a manner similar to that already known in conventional scanners.

The invention has been described in detail with particular reference to certain preferred embodiments thereof, but it will be understood that variations and modifications can be effected within the spirit and scope of the invention.

PARTS LIST

| PARTS LIST | |
|---|---|
| 2 | light bulb |
| 6 | filter |
| 8 | light concentrator cones |
| 8a 8b 8c | circuit boards |
| 11 | input port |
| 12 | exit port |
| 20 22 24 | assemblies |
| 40 | light concentrator cones |
| 41 | inlet end |
| 50 | light integrating chamber |
| 60 | exit port |
| 101 | filmgate |
| 102 | opening |
| 110 | film |
| 112 | image |
| 120 | lens assembly |
| 140 | CCD sensor |
| 160 | signal conditioner |
| 162 | frame buffer |
| 164 | line |
| 170 | processor |
| 172 | interface |
| 174 | memory |
| 176 | module |
| 180 | power supply |
| 190 | code reader |
| 200–220 | peaks |
| 200a–206a | curves |
| 200a'–220' | spectral sensitivities corresponding to subsets |
| 230, 240 | filters |
| (306–314) | steps |

What is claimed is:

1. A scanner comprising:
   a) A sensor assembly having a sensor to receive light from an image, and which assembly generates an image signal corresponding to the image, which image signal has a plurality of color channels, each color channel being representative of color channels, each color channel being representative of a different predetermined spectral region;
   b) a media holder to hold a media carrying the image; and
   c) a illuminator to illuminate the image of said media such that light from the image falls on the sensor, the illuminator comprising;
      i) a plurality of light emitting devices to provide illumination in all said spectral regions, each of said light emitting devices having a different spectral output, the number of different spectral light emitting devices being greater than the number of said color channels, said plurality of light emitting devices being grouped into at least one subset comprising at least two different light emitting devices such that they combine together to form one of said spectral regions for one of said color channels;
      ii) an integrator between the light emitting devices and the media holder for integrating the light from said plurality of light emitting devices and the media holder from integrating the light from said plurality of light emitting devices which illuminates the image.

2. A scanner according to claim 1 wherein the integrator improves spectral uniformity of the illumination from said at least one subset.

3. A scanner according to claim 1 wherein the light emitting elements are solid state devices.

4. A scanner according to claim 1 wherein the light emitting devices are light emitting diodes.

5. A method of spectrally calibrating a scanner of claim 1, the method comprising:
   (a) operating a said at least one subset of light emitting devices for predetermined times or powers;
   (b) measuring a signal in the one color channel from the sensor assembly which corresponds to the at least one subset operated in step (a);
   (c) comparing characteristic actual value of the signal with an aim value;
   (d) when the actual and aim values differ by more than a predetermined tolerance, adjusting a time or power used in step (a);
   (e) repeating steps (a) through (d) as necessary, until the characteristic actual value and the aim value differ by no more than the predetermined tolerance; and
   (f) repeating steps (a) through (e) for each of said at least one sub-set of light emitting devices of different spectral output corresponding to the same one color channel.

6. A method according to claim 5 additionally comprising:
   (f) following step (e), storing the power or time values for each of said at least one sub-set of light emitting devices of different spectral output corresponding to the one color channel.

7. A scanner according to claim 1 wherein the sensor assembly provides an image signal having color channels representative of the red, green and blue spectral regions, or the cyan, magenta and yellow spectral regions.

8. A scanner according to claim 7 wherein the at least one of said subsets light emitting devices has a spectral output within the red color channel.

9. A scanner according to claim 1 wherein the sensor is a two-dimensional array sensor and the array of light emitting devices is a two-dimensional array.

10. A scanner according to claim 9 wherein the processor causes each said light emitting devices for each sub-set to be turned on simultaneously.

11. A scanner according to claim 1 wherein said at least one subset comprises a plurality of subsets, each of subsets having a plurality of light emitting devices, each of said light emitting devices of each subset have a majority of their integrated spectral output within a spectral region represented by one of said color channels.

12. A scanner according to claim 11 additionally comprising a variable power supply which can adjust the total relative exposures provided by the light emitting devices, and which can independently control different sub-sets of light emitting devices, and which can independently control different sub-sets of so as to adjust the spectral distribution of the exposure within at least one of said plurality of color channels.

13. A scanner according to claim 12 additionally comprising:
   a processor to control the variable power supply; and
   a memory communicating with the processor to carry different control data sets for respective different media;
   wherein the processor control the power supply to alter both the relative exposures provided by the different light emitting devices to control color balance, and independently controls each of said sub-sets to control scanner spectral sensitivity within at least the first color channel, for different media in accordance with control data sets carried by the memory.

14. A scanner according to claim 13 additionally comprising an operator input to allow an operator to input to the scanner an indication of the media carrying the image to be scanned, and wherein the processor automatically selects a control data set in response to the indication.

15. A scanner according to claim 14 wherein the memory includes a first control data set corresponding to a photographic negative media and a second control data set corresponding to a photographic reversal media.

16. A scanner according to claim 13 wherein the variable power supply adjusts the total relative exposures provided by the different exposure sets, and independently controls different sub-sets of different spectral output by adjusting power to, or on time of, the light emitting devices associated with each of said subsets.

17. A scanner according to claim 13 additionally comprising a communication module to receive exposure data sets from a remote host.

18. A scanner according to claim 13 additionally comprising a media code reader to read a code associated with the media which provides an indication of the media carrying the image to be scanned, and wherein the processor automatically selects a control data set in response to the indication.

19. A method of scanning an image on a media using a scanner of claim 1, comprising:
   (a) illuminating the image with the illuminator after the light has passed through the integrator;
   (b) generating the image signal at the sensor assembly.

20. A method according to claim 19 wherein:
   each set of the light emitting device sets is turned on in sequence, all of said light emitting devices of said at least one sub-set the different sub-sets being turned on simultaneously; and
   the sensor signals generated while each set is on are saved as respective color channel signals.

* * * * *